(12) United States Patent
Sexauer et al.

(10) Patent No.: US 8,650,109 B2
(45) Date of Patent: Feb. 11, 2014

(54) SYSTEM AND METHOD FOR DEFINED CONTRIBUTION DEFAULT BENCHMARK

(75) Inventors: Stephen Charles Sexauer, La Jolla, CA (US); Daniel Philip Cassidy, Concord, MA (US); Michael Walter Peskin, New York, NY (US)

(73) Assignee: Allianz Global Investors US LLC, New York, NY (US)

( * ) Notice: Subject to any disclaimer, the term of this patent is extended or adjusted under 35 U.S.C. 154(b) by 94 days.

(21) Appl. No.: 13/282,356

(22) Filed: Oct. 26, 2011

(65) Prior Publication Data

US 2012/0158435 A1  Jun. 21, 2012

Related U.S. Application Data

(60) Provisional application No. 61/406,980, filed on Oct. 26, 2010.

(51) Int. Cl.
G06Q 40/00 (2012.01)

(52) U.S. Cl.
USPC ............................................ 705/36 R; 705/4

(58) Field of Classification Search
USPC ............................................... 705/35–45, 4
See application file for complete search history.

(56) References Cited

U.S. PATENT DOCUMENTS

| | | | |
|---|---|---|---|
| 7,647,261 B2 * | 1/2010 | Merton et al. | 705/35 |
| 8,015,092 B2 * | 9/2011 | Tatro et al. | 705/36 R |
| 8,095,397 B2 | 1/2012 | Gray et al. | |
| 8,135,598 B2 | 3/2012 | Brown et al. | |
| 8,209,197 B2 * | 6/2012 | Tatro et al. | 705/4 |
| 8,370,243 B1 * | 2/2013 | Cernyar | 705/36 R |
| 8,412,545 B2 * | 4/2013 | Stiff et al. | 705/4 |
| 8,533,080 B2 * | 9/2013 | Multer et al. | 705/35 |
| 2004/0177022 A1 * | 9/2004 | Williams et al. | 705/36 |
| 2006/0212380 A1 * | 9/2006 | Williams et al. | 705/35 |
| 2008/0270194 A1 | 10/2008 | West et al. | |
| 2008/0306878 A1 * | 12/2008 | Elam et al. | 705/36 R |
| 2009/0094070 A1 * | 4/2009 | Harris et al. | 705/4 |

OTHER PUBLICATIONS

Harrington, Cynthia, "Where go variable annuities in a withering stock market?", Accounting Today, 15.1 (Jan. 28, 2001), pp. 1-2.*
Ackerman, Matt, "Pimco Launches Inflation-Hedged Funds", American Banker [New York, N.Y.], Sep. 9, 2009, pp. 1-2.*
Hamling, John N, "Commentary: TIPS' attraction keeps growing", Daily Record [Rochester, NY], Sep. 23, 2009, pp. 1-3.*

(Continued)

Primary Examiner — Mohammad Z Shaikh
(74) Attorney, Agent, or Firm — Knobbe, Martens, Olson & Bear LLP

(57) ABSTRACT

A system and method for generating an integrated family of benchmarks representing portfolio allocations for a participant is described. At least two assets for a portfolio are identified. A current market rate for at least one of the assets and an expected inflation for a predetermined time period are determined via a computing device. The computing device determines a portfolio allocation to each asset based on the current market rate and the expected inflation so as to define a process for obtaining inflation-protected income for a predetermined number of years and then non-inflation protected income for subsequent years. The identified assets and the portfolio allocations are published via a network.

22 Claims, 12 Drawing Sheets

(56) References Cited

OTHER PUBLICATIONS

Shankar, S Gowri, "A new strategy to guarantee income using TIPS and longevity insurance", Financial Services Review 18.1 (Spring 2009): pp. 53-68.*

Farrow, Paul, "How to wave goodbye to inflation Savings accounts with negative returns, pensions that lose three quarters of their value—a rising RPI is not joke. But you can take action, as Paul Farrow explains", The Sunday Telegraph [London (UK)], Jan. 21, 2007, pp. 1-3.*

Toolson, Richard B, PhD, CPA, "Tax Planning for the Use of Tips at Retirement", The Tax Adviser, 38. 11 (Nov. 2007), pp. 666-672.*

"PIMCO Real Income™ Funds", Pacific Investment Management Company LLC (PIMCO), A company of Allianz Global Investors Distributors LLC, 2009, 8 pgs.

* cited by examiner

SYSTEM AND METHOD FOR DEFINED CONTRIBUTION DEFAULT BENCHMARK

CROSS-REFERENCE TO RELATED APPLICATIONS

This application claims the benefit of U.S. Provisional Application No. 61/406,980, filed Oct. 26, 2010, and entitled System and Method for Defined Contribution Default Benchmark, which is incorporated by reference in its entirety.

BACKGROUND

1. Field of the Invention

The field is retirement income generally, and specifically, a system and method for benchmarking for a sustainable and real (after-inflation) retirement income for a participant's remaining lifetime.

2. Description of the Related Art

A large and looming issue is the need to convert over $7 trillion of defined contribution (DC) and IRA-type assets in the United States into lifetime retirement income: income that maintains its purchasing power throughout a retirement that can last only a few years or as long as thirty or more years. This assets-to-income process is the subject of this description.

To accomplish this, however, there must first be an initial and broader discussion of retirement income, especially the reality that there is no risk-free retirement income scheme. All retirement-income schemes, from Social Security to a bank savings account, contain risks and these risks are material and they vary only in degree. The reality of a no-risk-free pension scheme is very important and often underappreciated.

Sustainable and real (after-inflation) retirement income is a major goal of work. This work produces a wide range of income sources and individual income levels, reflecting the overall wealth and the economic diversity in America.

From this work, almost all Americans will draw retirement income from three financial sources. First there is Social Security. Next there are defined-benefit (DB) pension schemes, and personal savings that are mostly held in defined-contribution plans and IRAs. There is also retirement income derived from working during "retirement." Workers who are not in Social Security are covered by the Railroad Retirement Board or Teachers Retirement Systems in thirteen states and most government employees who do not participate in Social Security. For the purposes of this description, one can group view all non-DB, DC, and IRA retirement plans as "Social Security-like" in that they are promises of a government entity.

SUMMARY

In one embodiment, there is a method of generating an integrated family of benchmarks representing portfolio allocations for a participant, the method comprising identifying at least two assets for a portfolio; determining, via a computing device, a current market rate for at least one of the assets; determining, via the computing device, expected inflation for a predetermined time period; generating, via the computing device, a portfolio allocation to each asset based on the current market rate and the expected inflation so as to define a process for obtaining inflation-protected income for a predetermined number of years and then non-inflation protected income for subsequent years; and publishing, via a network connected to the computing device, the identified assets and the portfolio allocations.

In another embodiment, there is a method of generating a benchmark representing portfolio allocations of portfolio assets for a participant, the method comprising obtaining, via a computing device, at least one of stated payout ratios periodically for at least one treasury inflation protected securities (TIPS) portfolio or fund offered by an asset management company, or payouts of a predetermined number of years laddered TIPS portfolio; identifying, via the computing device, at least an annuity sponsored by an insurance company; selecting, via the computing device, a particular TIPS portfolio or fund based on the payout ratios and a particular annuity based on a current market price; determining, via the computing device, a portfolio allocation for the selected TIPS portfolio or fund and the selected annuity so as to define a process for obtaining inflation-protected income for the predetermined number of years and then non-inflation protected income for subsequent years; and publishing, via a network connected to the computing device, the portfolio assets and corresponding allocations.

In another embodiment, there is a method of periodically generating a benchmark representing portfolio allocations of portfolio assets for a participant, the method comprising recording, via a computing device into a storage, at least one of the payout of predetermined (D) year self-liquidating treasury inflation protected securities (TIPS) funds, or the payouts of a predetermined number of years laddered TIPS portfolio; recording, via the computing device into the storage, the D year TIPS break-even inflation rate; for a D year deferral, calculating, via the computing device, the TIPS distribution rate at year D at the current break-even inflation rate as (1+D year TIPS break even inflation rate)^D*payout of D=zero year TIPS fund or laddered portfolio=TDR_YD; recording, via the computing device into the storage, the cost of a deferred annuity that provides $1 for life beginning in D years (CO$1) using a preselected list of insurance companies offering a deferred annuity at D years; calculating, via the computing device, the cost of an annuity that provides a payout equal to the TIPS payout at D years as (CO$1*TDR_YD), wherein (CO$1*TDR_YD)/(1+CO$1*TDR_YD) is a portfolio allocation percentage for the deferred annuity; calculating, via the computing device, the cost to acquire the TIPS fund as 1/(1+CO$1*TDR_YD), which is a portfolio allocation percentage for the TIPS funds; and publishing, via a network connected to the computing device, the portfolio assets and corresponding allocation results.

In another embodiment, there is a method of generating a benchmark representing portfolio allocations of portfolio assets for a participant at a predetermined time interval, the method comprising recording, via a computing device into a storage, at least one of the payout of 20 year self-liquidating treasury inflation protected securities (TIPS) funds, or the payouts of a 20 year laddered TIPS portfolio; recording, via the computing device into the storage, the 20 year TIPS break-even inflation rate; for a 20 year deferral (D), calculating, via the computing device, the 20 year TIPS distribution rate at year 20 at the current break-even inflation rate as (1+20 year TIPS break-even inflation rate)^D*payout of D=year zero TIPS fund or laddered portfolio=TDR_year20; recording, via the computing device into the storage, the cost of a deferred annuity that provides $1 for life beginning in 20 years (CO$1) using a preselected list of insurance companies offering a 20 year deferred annuity; calculating, via the computing device, the cost of an annuity that provides a payout equal to the year 20 TIPS payout as (CO$1*TDR_year20), wherein (CO$1*TDR_year20)/(1+CO$1*TDR_year20) is a portfolio allocation percentage for the deferred annuity; calculating, via the computing device, the cost to acquire the TIPS fund as 1/(1+CO$1*TDR_year20), which is a portfolio allocation percentage for the TIPS funds; and publishing, via a network connected to the computing device, the portfolio assets and corresponding allocation results.

In another embodiment, there is a computer readable medium having instructions that when executed by a processor perform a method comprising obtaining at least one of stated payout ratios periodically for at least one treasury inflation protected securities (TIPS) portfolio or fund offered by an asset management company, or payouts of a predetermined number of years laddered TIPS portfolio; identifying at least an annuity sponsored by an insurance company; selecting a particular TIPS portfolio or fund based on the payout ratios and a particular annuity based on a current market price; determining a portfolio allocation for the selected TIPS portfolio or fund and the selected annuity so as to define a process for obtaining inflation-protected income for the predetermined number of years and then non-inflation protected income for subsequent years; and publishing, via a network, the portfolio assets and corresponding allocations.

In yet another embodiment, there is a system for generating an integrated family of benchmarks representing portfolio allocations for a participant, the system comprising means for identifying at least two assets for a portfolio; means for determining a current market rate for at least one of the assets; means for determining expected inflation for a predetermined time period; means for generating a portfolio allocation to each asset based on the current market rate and the expected inflation so as to define a process for obtaining inflation-protected income for a predetermined number of years and then non-inflation protected income for subsequent years; and means for publishing the identified assets and the portfolio allocations.

DETAILED DESCRIPTION OF CERTAIN EMBODIMENTS

Introduction

Figure 1A:
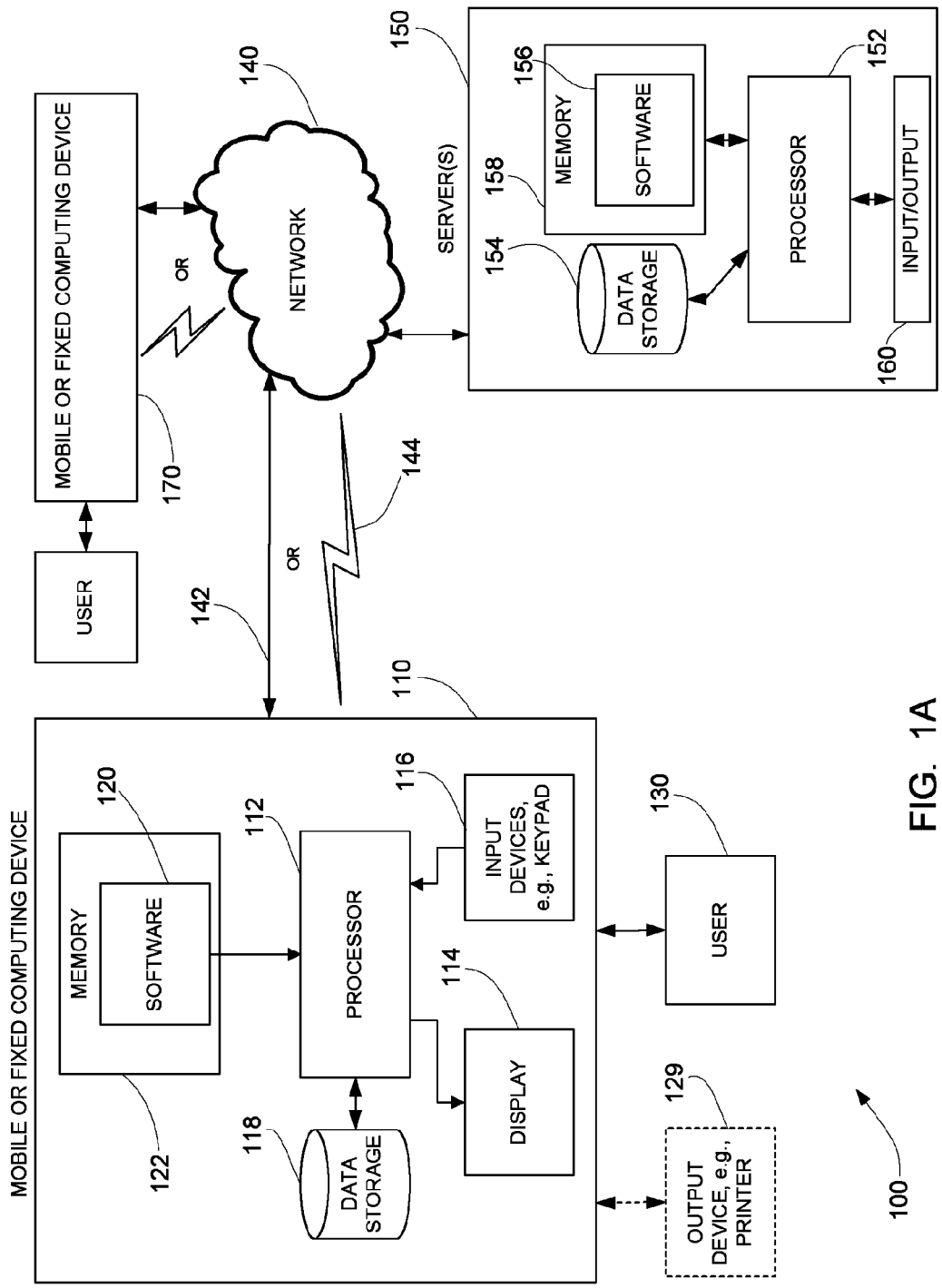
FIG. 1A is a diagram of an example of one embodiment of a configuration for operating a system and method to obtain a defined contribution default benchmark.

The system and method described herein can be implemented on various configurations of hardware and software. The system can be comprised of various modules, tools, and applications as discussed below. As can be appreciated by one of ordinary skill in the art, each of the modules may comprise various sub-routines, procedures, definitional statements and macros. Each of the modules are typically separately compiled and linked into a single executable program. Therefore, the following description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system modules, tools, and applications may be written in any programming language such as, for example, C, C++, C#, BASIC, Visual Basic, Pascal, Ada, Java, HTML, XML, or FORTRAN, and executed on an operating system, such as variants of Windows, Macintosh, UNIX, Linux, VxWorks, or other operating system. C, C++, C#, BASIC, Visual Basic, Pascal, Ada, Java, HTML, XML and FORTRAN are industry standard programming languages for which many commercial compilers can be used to create executable code.

Definitions

The following provides a number of useful possible definitions of terms used in describing certain embodiments of the disclosed development.

A network may refer to a network or combination of networks spanning any geographical area, such as a local area network (LAN), wide area network (WAN), regional network, national network, and/or global network. The Internet is an example of a current global computer network. Those terms may refer to hardwire networks, wireless networks, or a combination of hardwire and wireless networks. Hardwire networks may include, for example, fiber optic lines, cable lines, ISDN lines, copper lines, etc. Wireless networks may include, for example, cellular systems, personal communications service (PCS) systems, satellite communication systems, packet radio systems, and mobile broadband systems. A cellular system may use, for example, code division multiple access (CDMA), time division multiple access (TDMA), personal digital phone (PDC), Global System Mobile (GSM), or frequency division multiple access (FDMA), among others.

A website may refer to one or more interrelated web page files and other files and programs on one or more web servers. The files and programs are accessible over a computer network, such as the Internet, by sending a hypertext transfer protocol (HTTP or HTTPS [S-HTTP]) request specifying a uniform resource locator (URL) that identifies the location of one of said web page files, where the files and programs are owned, managed or authorized by a single business entity. Such files and programs can include, for example, hypertext markup language (HTML) files, common gateway interface (CGI) files, and Java applications. The web page files preferably include a home page file that corresponds to a home page of the website. The home page can serve as a gateway or access point to the remaining files and programs contained within the web site. In one embodiment, all of the files and programs are located under, and accessible within, the same network domain as the home page file. Alternatively, the files and programs can be located and accessible through several different network domains.

A web page or electronic page may include that which is presented by a standard web browser in response to an HTTP request specifying the URL by which the web page file is identified. A web page can include, for example, text, images, sound, video, and animation.

A computer or computing device may be any processor controlled device that permits access to the Internet, including terminal devices, such as personal computers, workstations, servers, clients, mini-computers, main-frame computers, laptop computers, a network of individual computers, mobile computers, palm-top computers, hand-held computers, set top boxes for a television, other types of web-enabled televisions, interactive kiosks, personal digital assistants (PDAs), interactive or web-enabled wireless communications devices, mobile web browsers such as operating on a smartphone, or a combination thereof. The computers may further possess one or more input devices such as a keyboard, mouse, touch pad, joystick, pen-input-pad, and the like. The computers may also possess an output device, such as a visual display and an audio output. One or more of these computing devices may form a computing environment.

These computers may be uni-processor or multi-processor machines. Additionally, these computers may include an addressable storage medium or computer accessible medium, such as random access memory (RAM), an electronically erasable programmable read-only memory (EEPROM), programmable read-only memory (PROM), erasable programmable read-only memory (EPROM), hard disks, floppy disks, laser disk players, digital video devices, compact disks, video tapes, audio tapes, magnetic recording tracks, electronic networks, and other techniques to transmit or store electronic content such as, by way of example, programs and data. In one embodiment, the computers are equipped with a network communication device such as a network interface card, a modem, or other network connection device suitable for connecting to the communication network. Furthermore, the computers execute an appropriate operating system such as Linux, UNIX, any of the versions of Microsoft Windows, Apple MacOS, IBM OS/2 or other operating system. The appropriate operating system may include a communications protocol implementation that handles all incoming and outgoing message traffic passed over the network. In other embodiments, while the operating system may differ depending on the type of computer, the operating system will continue to provide the appropriate communications protocols to establish communication links with the network.

The computers may contain program logic, or other substrate configuration representing data and instructions, which cause the computer to operate in a specific and predefined manner, as described herein. In one embodiment, the program logic may be implemented as one or more object frameworks or modules. These modules may be configured to reside on the addressable storage medium and configured to execute on one or more processors. The modules include, but are not limited to, software or hardware components that perform certain tasks. Thus, a module may include, by way of example, components, such as, software components, object-oriented software components, class components and task components, processes, functions, attributes, procedures, subroutines, segments of program code, drivers, firmware, microcode, circuitry, data, databases, data structures, tables, arrays, and variables.

The various components of the system may communicate with each other and other components comprising the respective computers through mechanisms such as, by way of example, interprocess communication, remote procedure call, distributed object interfaces, and other various program interfaces. Furthermore, the functionality provided for in the components, modules, and databases may be combined into fewer components, modules, or databases or further separated into additional components, modules, or databases. Additionally, the components, modules, and databases may be implemented to execute on one or more computers. In another embodiment, some of the components, modules, and databases may be implemented to execute on one or more computers external to the website. In one instance, the website includes program logic, which enables the web site to communicate with the externally implemented components, modules, and databases to perform the functions such as disclosed herein.

Description

Embodiments will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments. Furthermore, embodiments may include several novel features, no single one of which is solely responsible for its desirable attributes or which is essential to practicing the inventions herein described.

Example System Configuration

Figure 1B:
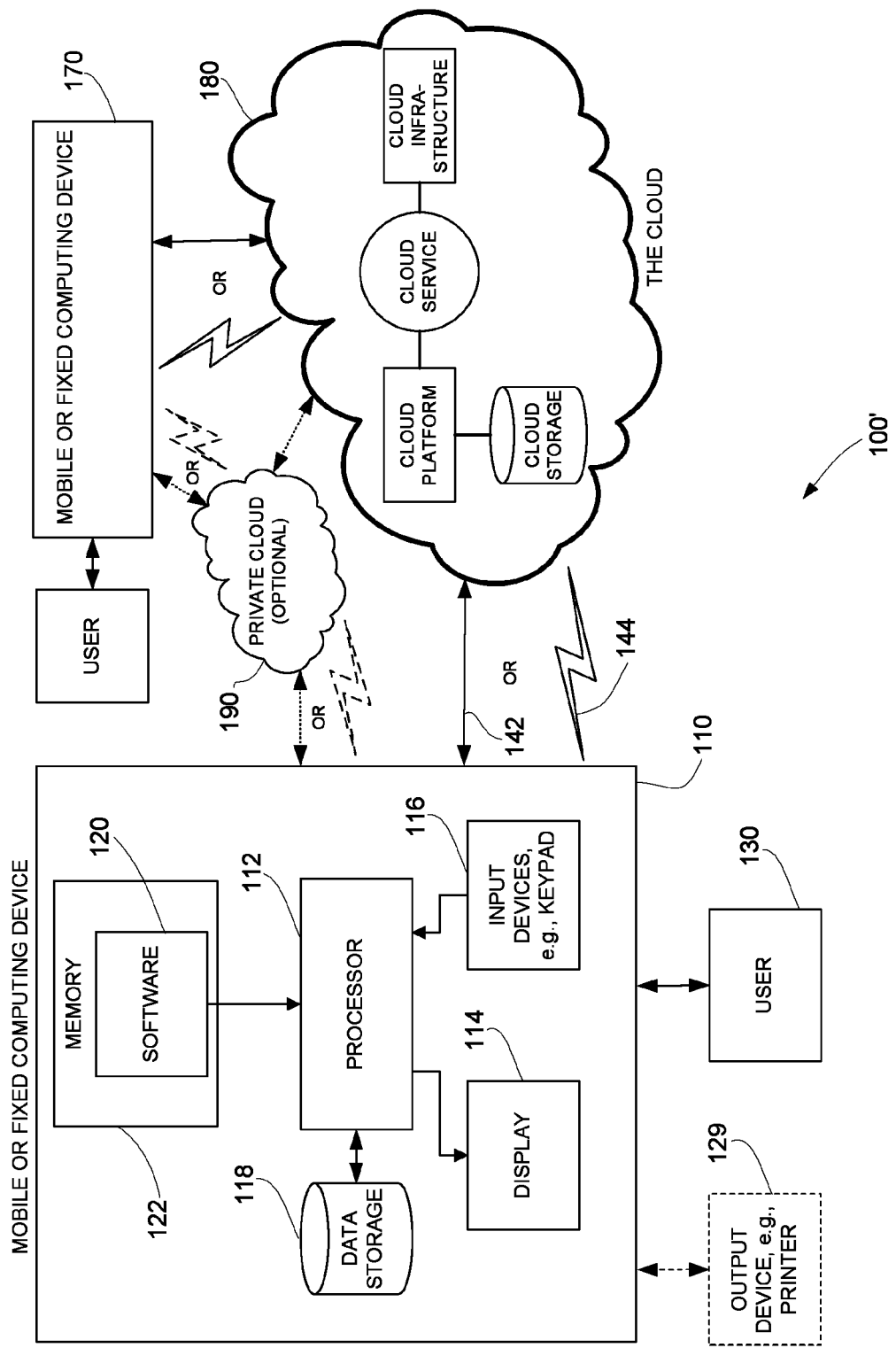
FIG. 1B is a diagram of an example of another embodiment of a configuration for operating a system and method to obtain a defined contribution default benchmark.

Certain embodiments of a system utilize a network as described in conjunction with FIG. 1A hereinbelow, or utilize a cloud, as described in conjunction with FIG. 1B hereinbelow. Certain embodiments are based on an example open system integrated architecture shown in FIG. 1A and FIG. 1B. In FIGS. 1A and 1B, the example open system integrated architecture may be based on, for example, a user interface interacting with a local or remote data repository and a local or remote application running on a local or remote application server, such as an application server 150. FIGS. 1A and 1B are block diagrams of an example system 100 that may be used to implement certain systems and methods described herein. The functionality provided for in the components and modules of computing system 100 may be combined into fewer components and modules or further separated into additional components and modules. Various other types of electronic devices communicating in a networked environment may also be used.

Referring to FIG. 1A, an example configuration of components of an embodiment of the system 100 will now be described. A mobile or fixed computing device 110 is operated by a user 130. There may be other mobile or fixed computing devices such as a device 170 operated by other users. The computing device 110 can be a handheld computing device or other portable computing device such as a Palm, Pocket personal computer (PC), Linux based handheld, PDA, smartphone such as an iPhone®, Tablet computer such as an iPad®, or PC having a display. In other embodiments, the computing device can be any form of Internet connected device, including but not limited to PCs, mobile devices, PDA, laptops, tablets, chips, keyboards, voice audio and video software, mouse, keypads, touch pads, track ball, microphones, videos, storage devices, network devices, databases, scanners, copiers, digital pens, image recognition software and device, screens and other forms of displays, netbooks and other forms of computer hardware. The computing device 110 in certain embodiments operates in a stand-alone (independent) manner. In other embodiments, the computing device 110 is in communication with one or more servers 150 via a network 140, such as a wide area network or the Internet. The server(s) include one or processors 152, memory 158, data storage 154 and system software 156 executed by the processor(s), and input or output devices 160. In certain embodiments, the data storage 154 stores one or more databases used by the system. The processor(s) 152 are in communication with the database(s) via a database interface, such as structured query language (SQL) or open database connectivity (ODBC). In certain embodiments, the data storage 154 is not included in server(s) 150, but is in data communication with the server(s) via the database interface. The connection from the computing device 110 to the network 140 can be a wireless or a satellite connection 144 or a wired or direct connection 142. In certain embodiments, the server(s) are part of a web site, such as on an intranet or the Internet.

When the computing device 110 is connected with the server(s) 150, the web site may optionally provide updates on new features. In another embodiment, the computing device runs software for the system and method described herein only when connected to the server(s) 150.

The computing device 110 includes a processor 112, memory 122, a display 114, and one or more input devices 116. The processor 112 is in data communication with a data storage 118. In certain embodiments, the data storage 118 may store prior records of the user and/or other data or software. System software 120 is executed by the processor 112. The system software 120 may include an application graphical user interface (GUI). The application GUI can include a database interface to the data storage 118 of the computing device. In certain embodiments, the software is loaded from the data storage 118. In embodiments where the computing device 110 communicates with a web site, the processor utilizes browser software in place of or in addition to the software 120. The network browser may be, for example, Microsoft Internet Explorer®, Apple Safari®, Mozilla Firefox®, Google Chrome™, browsers from Opera Software™, and so forth. An optional output device 129, such as a printer is connected to the computing device 110.

Referring to FIG. 1B, an example configuration of components of an embodiment of the system 100 using a cloud computing architecture will now be described. The configuration of components in FIG. 1B is similar to that of FIG. 1A except that the network 140 and servers 150 of FIG. 1A are replace by the cloud 180 of FIG. 1B. An optional private cloud 190 can also be utilized. Cloud computing can include web-based tools or applications that users can access and use through a web browser as if it were a program installed locally on their own computer. In certain embodiments, the cloud 180 comprises various computers, servers and data storage devices that function to provide a cloud platform (e.g., a web front end), cloud service (e.g., a queue), cloud infrastructure, and cloud storage (e.g., a database). A public/external cloud can be used with a private cloud in a hybrid cloud or a combined cloud environment in certain embodiments Overview Successful retirement-income schemes require a savings plan to transfer work today to income in the future and then an assets-to-income scheme to convert accumulated savings into retirement income that will last a lifetime—a lifetime that is increasingly lengthening and for an individual, is quite unpredictable in its length. The core of all retirement-income plans will have two key components: an asset transfer vehicle and an assets-to-retirement income scheme.

A major change over the last twenty-five years is the large and rapidly growing role of defined-contribution plans and IRAs to provide retirement income, with the dominant characteristic that the management of the two core components of a retirement-income scheme have been transferred from the pension plan sponsor to the worker (and future retiree). It is the dramatically increased role of DC plans and a specific focus on improving the assets-to-income scheme in retirement that sets the framework for the two formal purposes of this description:

Show that the structure of a sustainable retirement-income program does not depend on the pension scheme (DB or DC), but on the benefits promises pursued, the asset vehicles used, and the choice of the asset-to-income options available to the retiree. In other words, the core components of a good DC plan will look and feel like the core components of a good DB plan.

For the retirement-income distribution phase, a key, but so far missing component for solving the assets-to-income problem embedded in the current structure of all defined-contribution plans is offered: A Defined Contribution Default Benchmark (DCDB).

This benchmark is the basis from which retirees can make their retirement asset allocation decisions. It is this benchmark, and its use with existing market structures, that provides a key step in solving the defined-contribution distribution problem.

The description is organized as follows. Section I reviews where we are today, and defines the common core elements of all retirement schemes. Section II explores the risks of pension-income shortfalls and failure. In Section III, the economic structures and challenges of both DB plans and DC plans are analyzed in more detail. An analysis is presented showing that a sound DC plan should not be unlike a sound DB plan. In Section IV, the DC distribution problem is analyzed and a sound and executable Defined Contribution Default Benchmark (DCDB) for retirement income is introduced. Section V develops and shows the structure and calculations for the Defined Contribution Default Benchmark (DCDB). Section VI is the conclusion.

The Appendix is a history of pension failures. This is important given that many believe that a "risk-free" pension system exists, or can be created.

I. Retirement Schemes

Background and Economics

There are three sources of retirement income for American workers: Social Security (and other promises of a government entity, as previously discussed), Pension Schemes (DB plans), and personal assets held in DC plans, IRAs and taxable accounts. These plans cover 52 million retired Americans and 130 million working Americans.

Figure 6:
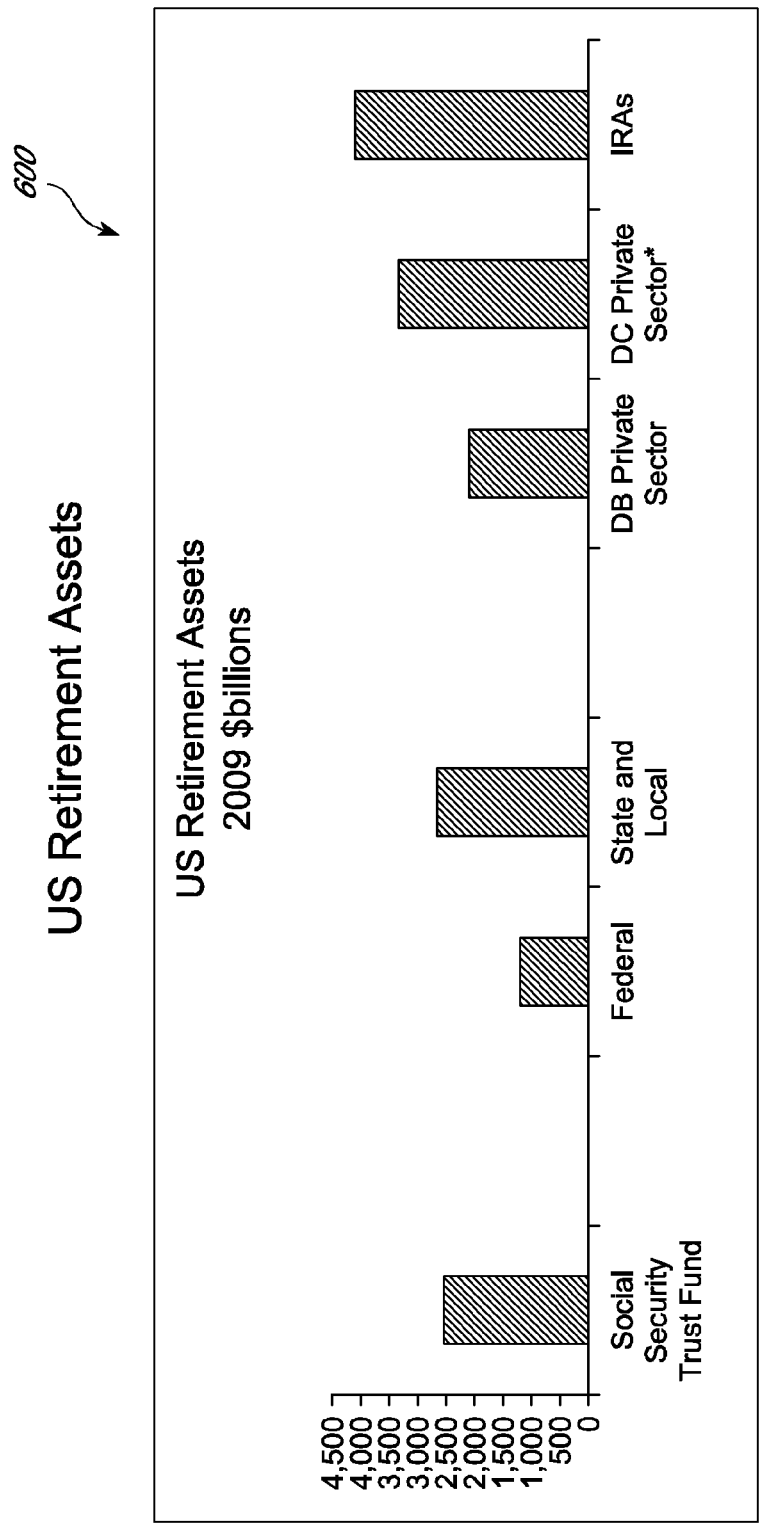
FIG. 6 is a chart illustrating U.S. retirement assets in the year 2009.

The combined assets in these plans were just under $16 trillion at year-end 2009. See chart 600 of U.S. retirement assets in FIG. 6 where plan assets at December 2009 ($ billions) were 15,987 (source: Flow of Fund Accounts of the United States, Federal Reserve Statistical Release, Mar. 11, 2010, Overview of the Social Security Administration, SSA 2009 Performance and Accountability Report). These assets are the pillars of retirement income for American workers.

Over the past quarter century, a striking change has taken place in the retirement income profile for workers covered by a pension plan. Defined-contribution (DC) plans have expanded to become the dominant employer-sponsored retirement plan for Americans, with work-based coverage expanding from 12% to 63%. At the same time, workers covered by defined-benefit plans (DB) have dropped from 62% to 17%. At the beginning and at the end of this period, 52% of US workers were covered by an employer-sponsored DC or DB pension plan.

Figure 7:
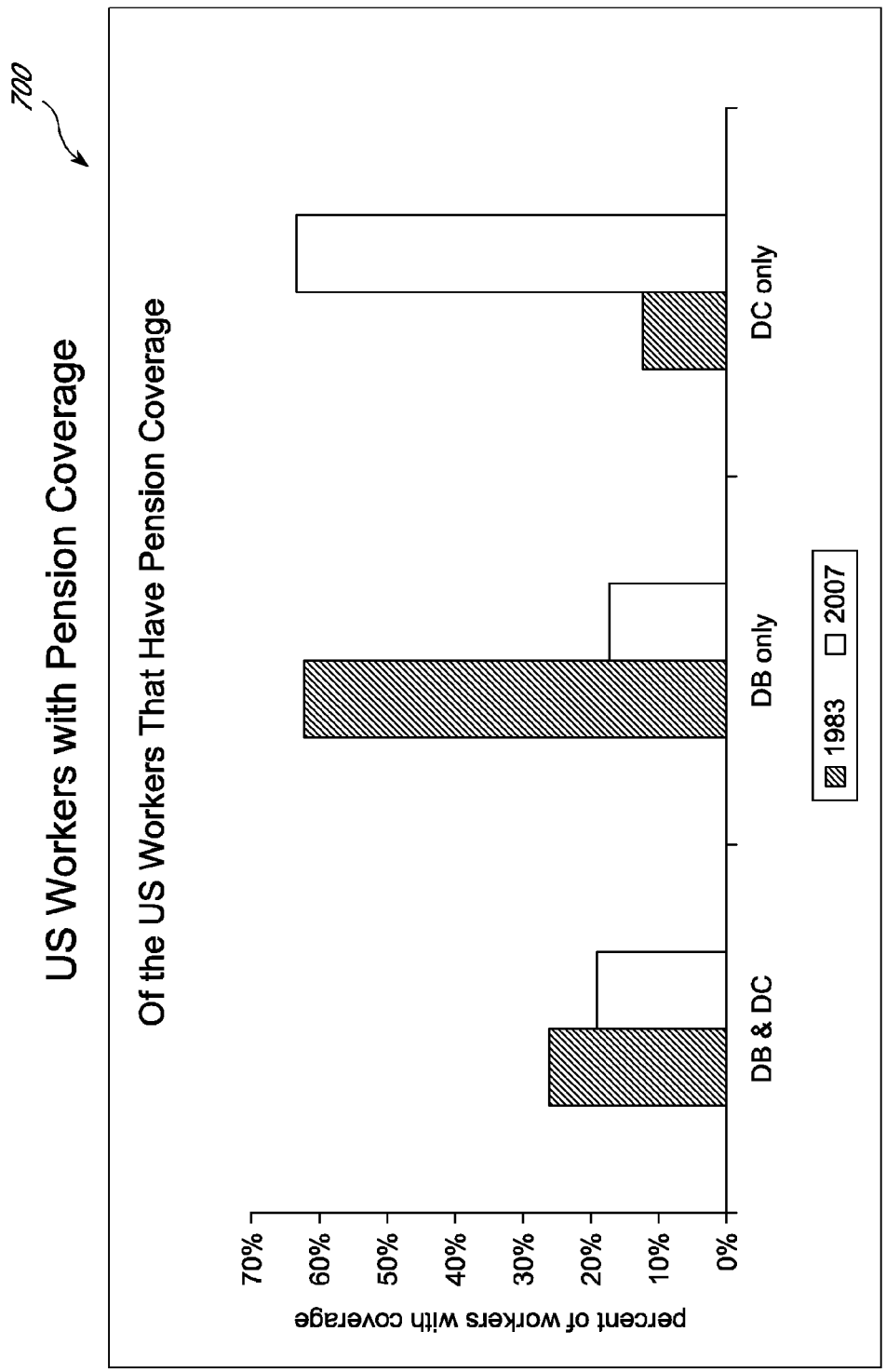
FIG. 7 is a chart illustrating U.S. workers with pension coverage in the years 1983 and 2007.
Figure 8:
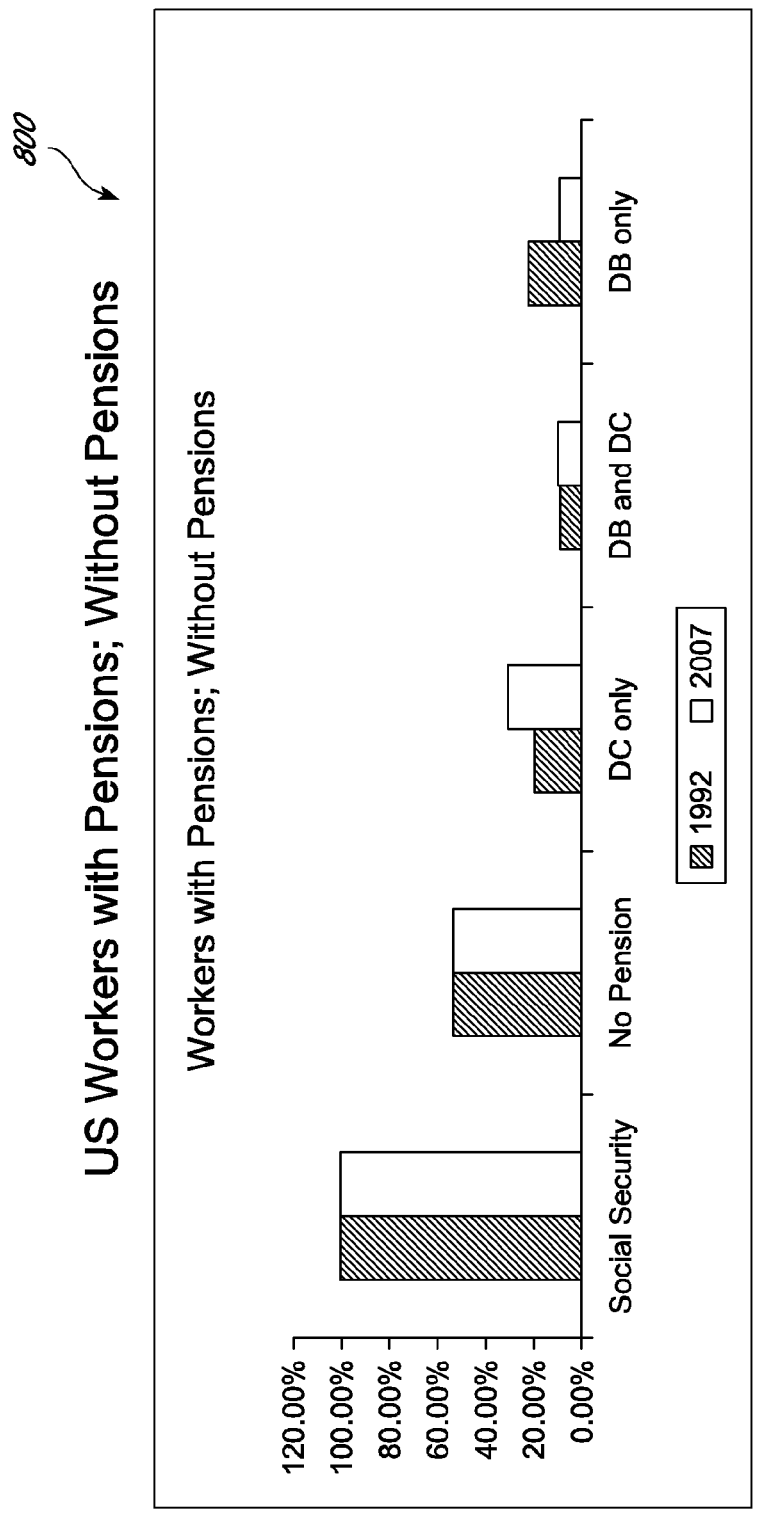
FIG. 8 is a chart illustrating U.S. workers with pensions and without pensions in the years 1992 and 2007.

Defined-benefit plans are often held out as the gold standard for retirement income. But, as chart 700 of U.S. workers with pension coverage in FIG. 7 (source: Munnell, Alicia H., Richard W. Kopcke, Francesca Golub-Sass and Dan Muldoon, 2009, "An Update on 401 (K) Plans: Insights from the 2007 Survey of Consumer Finance", Center for Retirement Research at Boston College, WP 2009-6, November 2009) and chart 800 of US workers with pensions and without pensions in FIG. 8 (source: "Frequently Requested Data", Center for Retirement Research at Boston College) show, they were never the broad-based longstanding solution to retirement income.

While DB plans have many powerfully positive attributes, including longevity pooling and the institutional scaling of costs and skills, they also have real and material economic limitations. The dominant limitations are (1) counter-party risk, when companies fail and then the pension promise fails and (2) the underlying structure of a retirement-income promise based on future wages. Since future wages are both unknown and cannot be hedged, the worker is left with an uncertain retirement income.

In 2009, American workers held approximately $7.3 trillion in DC plans and IRAs. The IRA balances include both DC roll-over balances (and possibly DB lump sum roll-overs) and self-funded pension assets not part of an employer-sponsored plan.

DC and IRA plans have attributes not found in DB plans that have been highly valued by participants—namely portability and individual ownership and control of the assets.

At the same time, these individual ownership plans have economic limitations that can and do create real hurdles in their use to provide real sustainable retirement income. These limitations include not saving enough, no pooling of longevity risk, limited institutional scaling for asset management, and no good solution to the DC distribution problem of converting assets to income in retirement. (For a thoughtful and thorough comparison of DB and DC plans, see "Don't Kill the Golden Goose, Saving Pension Plans" by Barton Waring and Lawrence Siegel, *Financial Analysts Journal*, Volume 63, No. 1, 2007.)

Economic Goals and Common Components

Each of the three core sources of retirement income—Government-based Social Security (widely defined), defined-benefit plans, and DC/IRA assets—has two common core components: a wealth transfer mechanism from the present (work) to the future (retirement income), and an assets-to-income capability that provides lifetime retirement income.

Retirement income must exhibit two dominant characteristics:
1. Sustainable real (after inflation) retirement income and
2. Longevity protection such that individuals do not outlive their income-generating assets.

Common elements to Social Security and DB pension schemes are retirement income based on pooling arrangements where the promises are made by, and the assets are held by, a counter-party. This counter-party is relied upon to measure, value, and fulfill the retirement-income promise. The retiree's claim is the promise of retirement income, not ownership of the underlying assets.

For Social Security, the counter-party is the United States Government. The pooling population is all past, present, and future United States taxpayers. This pooling provides both longevity pooling and asset protection pooling. The savings rates and retirement income benefits are set by the political process.

For state and local pension schemes, the counter-party is the local government entity, for example, the California State Teachers Employees Retirement System (CALSTERS). The pooling for longevity and asset protection is the past, present, and future workers in the scheme as well as the taxpayers within the state and local jurisdiction. The savings rates, retirement income benefits, and taxes are set in labor and political-election negotiations.

For private pension schemes and multi-employer pension schemes, the counter-party is the company or the pension entity. For example, the General Motors Salaried Retirement pension fund or the Service Employees International Union fund (SEIU). The pooling for longevity and asset protection is the past, present, and future workers in the scheme as well as current and future stock holders of the sponsoring corporations. Pooling and asset protection are dependent on the continued existence of the company and multi-employer pension scheme. The savings rates and retirement income benefits are set in labor negotiations. For private and multi-employer pension schemes, taxpayers may play a role as a limited funder-of-last-resort. For example, for private employers, this role is carried out by the Pension Benefit Guarantee Corporation (PBGC).

For DC-IRA plans, there is no counter-party. These plans are based on individual ownership of assets, the amount determined by a lifetime of savings and investment decisions. The savings and investment decisions are made by the individual. The resulting retirement income will be dependent on both individual savings and investment decisions and the realized investment and inflation results that the saver/retiree will live through and realize.

For DC-IRA plans, there is no counter-party to provide retirement income via the pooling of longevity and asset risk. In retirement, some or all of the DC-IRA assets will need to be converted into income. The decisions will be made by the retiree. There is no automatic institutional asset management to execute this conversion. There is no longevity or asset protection pooling. Any longevity and asset protection pooling must be separately researched and contracted for by the retiree.

Common Purpose and Problems

Social Security, defined benefit, and defined contribution pension schemes share a common purpose: transferring wealth and labor from today to future consumption. This future consumption is commonly called retirement income.

To do this, Social Security, defined benefit, and defined contribution retirement-income schemes have common components: a saving accumulation program, an investment program, and a distribution/de-accumulation programs.

Social Security, defined benefit, and defined contribution retirement-income schemes also have a common set of problems and risks, and these risks vary only in degree and who bears them.

The common set of risks (the relative importance of these risks will vary over time, and it will vary across plans) are as follows:
Counter-party risk
Savings risk—not saving enough for long enough
Investment return risk, including inflation risk
Longevity risk—living longer than the assets These problems have led to pension failures for all three types of pension schemes, and some have been catastrophic failures. In Section II and in the Appendix, these failures are reviewed. It is shown that there is no perfect pension scheme.

This makes a critical and overarching point: there is no risk-free retirement-income scheme.

II. Risk

The common view sees defined-benefit pensions as the gold standard against which to compare other retirement-income plans. Another common view is that Social Security is the risk-free option that covers all American workers. But these common views are not the case. As Section I laid out, all retirement-income schemes have material risks, even the highly regarded defined-benefit pension and Social Security.

From a retiree's point of view, all pensions can and do fail. When they fail, the failure comes from three basic causes:
1. The counter-party fails, even when the counter-party is a government.
2. The counter-party can change the rules, and it does so.
3. The structure is deficient and subject to large-scale failure.

The Appendix contains a detailed review of these causes of failure. This section provides an overview of pension failures. It ends with a general framework as to why pensions fail.

While governments have sovereign taxing powers to fund pension promises, they still fail to provide reliable pension income. The failure can be the total collapse of a government, but it is more typically hyper-inflating away the value of nominal pension promises. The most extreme and notable example was Germany in 1923, when hyperinflation consumed both the economy and the nominal pensions of German workers.

This inflation-failure is not limited to Germany. Since 1900, inflation episodes in excess of 400% occurred in many countries including Italy, Austria, Hungary, Russia, Brazil and Argentina. In all these cases, nominal pensions were destroyed by government policies that did not protect the pension promises made. The core point is even federal government as counter-party can fail to honor pension promises.

In the U.S., Social Security provides a lifetime benefit indexed to general wages and inflation for the lifetime of beneficiaries and their spouses. How could this pension promise fail? The benefits are financed on a pay-as-you-go system through taxes on working Americans. The burden of Social Security thus depends on the size of liabilities (number of retirees, level of benefits, and the longevity of retirees) relative to the size of the tax base (gross domestic product (GDP)). Thus a combination of falling birth rates, improving longevity, and the large debt burden on GDP can all stress the system. At some point the burden, along with other burdens on GDP, can become too large and the system fails.

What is more common is the counter-party failure of private companies and multi-employer plans. It was the 1974 failure of Studebaker that led to the Employment Retirement Income Security Act (ERISA). Company failures should be no surprise in a dynamic economy; failure should be part of the expected normal state of events. Examinations of America's top twenty companies since 1917 shows this state of events (see the Appendix, Table 10). These expected failures have led to the creation of the Pension Benefit Guarantee Corporation (PBGC) to take over, at a reduced income payout, failed pension plans. Once failure is expected to occur, it is important to organize the pension scheme to account for some level of hard-to-forecast failure of individual companies. The PBGC is one such step. As will be shown in Section III, there are more steps to take to improve the reliability of pension promises.

A second pension failure is when the counter-party can and does change the pension promise. Again, this is from the retiree's position. For example, the 2007-2009 recession created enormous stresses on the fiscal condition of many state governments. In addition, the fall in equity markets, combined with extraordinarily low interest rates, exposed massively underfunded state and local pension plans.

State and local governments, faced with these budget deficits and large unfunded pension promises, acted to change their public employee pension plans. For the states, 22 of 50 materially changed their pension plans in 2009 alone. These changes included raising retirement dates, increasing employee contribution rates, and in some cases, tying future cost-of-living increases to the funding status of the plan. A "political earthquake" is how the governor of the State of Illinois described the vote in 2009 to change Illinois public pension funding and payout rules.

State and local defined benefits pensions have underpriced their liabilities by using the expected rate of return on the assets rather than the appropriate bond rates to discount future benefits. As a result, to "pay" for these public pension promises, pension funds have taken significant risk to meet the high returns needed to finance their pension promises. For many funds, the risk has not paid off. Local taxpayers are then left with the resulting heavy pension burden. But, the wealthier taxpayers are able to migrate and leave the state. There is a considerable migration from high tax-paying states to low tax-paying states. This leaves the large unfunded liability to be shouldered by an even smaller tax base. The situation has and will result in some systems failing.

A third failure happens when the pension structure itself is deficient. For private companies and pubic employees, the defined-benefit promise is typically some form of retirement income based on a final salary payout percentage. The problem is that the value of this promise is very difficult to forecast and then hedge. Plus, many companies do not prefund the estimated promise with risk-free assets. Instead, they rely on risk-asset returns (typically equities) to combine with company and employee contributions to fund the pension promise. This leads to failure twenty-to-thirty years later when the value of the promise can be so far above the available pension assets and company cash flows that the company adjusts by freezing or terminating its pension plan.

For defined-contribution pension schemes, the primary failure comes from not saving enough for long enough. Failure also comes from investing retirement assets in companies or industries highly correlated with the workers' income, with Enron being the most well-known case where workers lost both their jobs and their retirement savings.

There are other material challenges to a successful defined-contribution plan, especially pooling for longevity and efficiently converting assets-to-income. But these are not so much deficiencies as they are economic conditions that need to be managed well; the deficiency can be the knowledge and skill required of the individual retiree to successfully undertake these tasks.

There is a basic framework for pension failure:
1. Promising pension benefits not based on existing capital market asset legal vehicles will lead to potential failure. For example, promising to pay an unknown salary level thirty years in the future when there is no way to invest in an asset that returns an unknown future wage rate.
2. Promising pension benefits, but not fully funding them, and thus relying on future funding from contributions or gains from higher risk, higher expected return assets.
3. A funded pension plan that relies in part, or in full, on the assumed long-term average returns to risk assets to fulfill the pension promises. Here if the returns are below expectation, the pension promise is at risk.

4. An assets-to-income scheme in retirement that does not efficiently provide lifetime inflation-protected income.

In Section III, the core purpose and requirements of a successful retirement-income scheme are analyzed. The case is built that by focusing on the objective of providing lifetime inflation-protected income, and by explicitly recognizing the risk trade-offs inherent in alternative pension schemes, individuals are best served when they can make fully informed decisions where the goal is to maximize the retirement-income benefit (utility) to the individual retiree.

III. Assets-to-Income

Figure 9:
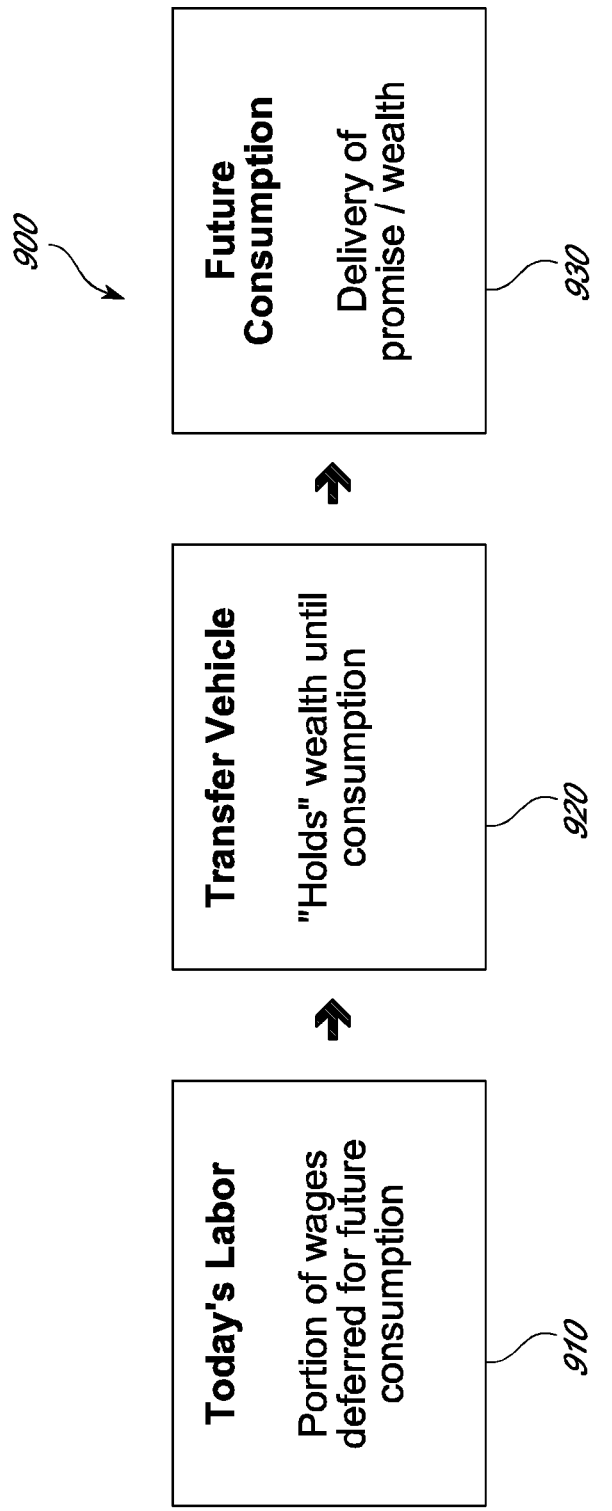
FIG. 9 is a flow diagram of an example wealth transfer.

Referring to FIG. 9, a flow 900 of wealth transfer will be described. All retirement plans seek to transfer wealth from today 910 to some future date. Transfer vehicles are specific legal structures to hold wealth 920 during this period, and in return for postponed consumption, earn a return on the wealth. At some future date the wealth will be converted into retirement income for consumption 930 as depicted in flow chart 900.

There are several key components in this transfer process:
Who owns the liability?
Who owns the assets—the government, the company/plan, the individual?
How much investment risk is taken?
How and by whom are the assets converted into lifetime income?

Today, two types of transfer vehicles are used to secure retirement income—private employers can only utilize the first, while government entities can utilize the second.

The first is the traditional asset vehicle. Dollars saved today are invested in assets—US Treasury securities, equities, annuities, corporate bonds, etc.—that are held to some future date. The performance of the assets then defines the wealth that can be transferred. In the case of a defined benefit plan, the deferred wages are partly invested in market securities (the plan assets) and partly in the sponsoring corporation (the promise to pay the unfunded liabilities). If the combined investment underperforms the price of the benefits then the benefits (or direct compensation to workers) will be curtailed. The underlying engine of this vehicle is the investment performance.

The second is the future tax collecting ability of a government entity. A primary example of this is U.S. Social Security. This system relies on the future GDP of the U.S. economy being sufficiently strong to support payments to the growing population of retirees from future tax collections. The underlying engine of this vehicle is the economy of the country. The nature and size of the "risk" attached to a future retirement income stream will depend on the strength of the linkage between the inflation adjusted retirement income promised or expected (the liabilities) and the performance of the underlying engine of the transfer vehicle (the direct or indirect assets).

There is no riskless way of transferring wealth into the future that will meet all the needs of all the participants for retirement income. This forces participants—individuals, companies, pooled industry schemes, and governments—to make trade-offs. These trade-offs are best measured and judged in a framework of risk and utility. For our purposes, the following definitions are used:

Risk—How certain is the payment of a future real, after inflation, dollar from a particular transfer vehicle over the joint lifetime of the investor and dependent spouse.

Utility—Ability of a transfer vehicle to satisfy investor-specific needs for retirement income for the life of the participant, including dimensions such as flexibility to access emergency funding, opportunistic investing, and other unexpected changes in preferences.

To set a baseline for a successful retirement-income scheme, the following objective is used as a starting point: a transfer vehicle and assets-to-income plan that has the lowest risk possible using existing legal structures and assets vehicles.

A risk lens is used that has four dimensions:
1. Savings risk—not saving enough for long enough
2. Investment return risk, including inflation
3. Counter-party risk
4. Longevity risk—living longer than the assets A dominant benefit design rule is defined as follows: benefits promised must be tied to existing capital markets vehicles. For example, promising inflation-protected income twenty years into the future would meet this rule since the TIPS market goes out for twenty years. Promising lifetime income that is based on the average of the final three years of salary would not meet the rule. Final salary in as much as thirty-five years cannot be forecasted; and even if it could be forecasted, there are no deep and close-to-risk-free asset vehicles that can be invested in today that go out to up to seventy years, thirty-five working years and thirty-five years of retirement.

A lowest-risk solution would be a scheme where the promises are only in nominal terms. The savings are invested in nominal government bonds that match the expected retirement-income cash flows to age 100. For young people, where retirement cash flows are more than thirty years away, the present value of those cash flows past thirty years would be invested in the then thirty-year bond. As time goes by, the present value held in the thirty-year bond is reinvested in the then longest maturity government security. The assets-to-income scheme is the bond coupons and the maturing bonds. The savings rate is based on the desired retirement income that is discounted back by current bond yields. This is the best that can be done with today's asset vehicles. We can call this the Low-Risk Cash Flow Matched Solution (LRCFMS).

This solution will minimize savings risk, assuming the savings actually happens. Investment return risk is minimized by investing in the lowest risk asset, government bonds. Counter-party risk is not zero, but it is as low as practically possible. Longevity risk is not zero as life expectancy is expanding, but it is extraordinarily low at 100. The assets-to-income (distribution) is determined by the laddered bond portfolio.

The solution could be adopted by 401(k) participants (using standard tools to estimate the key savings decisions). It could be used by private companies and multi-employer plans. Private companies and multi-employer funds would estimate final salary and then fund that income stream the same way a 401(k) participant would fund. It could be used by governments.

There are significant problems with this solution; and the utility for both plan sponsors and participants would be low, maybe very low. There are four key drawbacks, or to use a term from economics, costs:

First, there is no pooling for longevity. There is also no pooling for investment return risk across time. This means that every person must save for and provide an asset-to-income for the possibility of living to 100 when their expected life is 85. The cost of this, in terms of assets required, is 30%.

Second, all investments and cash flows are nominal. Retirement income should be real, after inflation, income. But, the TIPS market goes only twenty years, and the liquidity across is not uniformly deep. Hence, there is material inflation risk, not unlike the risk associated with today's DB and DC plans.

Third, there is a very large institutional-class management burden placed on DC investors; they must individually do all the calculations and rebalancing. This is also a sophisticated burden. It extends from evaluating "risk" in government bonds to rebalancing and recalculating the portfolio based on new information: a new job; a job loss; an inheritance; a divorce; children; any unexpected major change to individual circumstance or global markets. The rich body of research around decision making under uncertainty, from Kahnemann and Tversky's Prospect Theory to the growing field of Behavioral Finance, clearly shows that individuals are not well suited to make these decisions. And this skill mismatch widens as people grow older.

Fourth, there is limited-to-no flexibility. For example, one utility increasing choice for many individuals would be to invest some percent of their portfolio in equities, or similar higher-risk assets. The expectation is that over a long period of saving and returns there could be increased wealth, possibly as high as three times the wealth (and hence income) as could be realized from investing in risk-free government bills and bonds. The increased expected wealth and income is judged against the possible shortfall of wealth and income if investment returns do not match expectations, and even fall well below the risk-free return.

Another flexibility choice would be to underfund in the early years when incomes are low but expenses are high, and overfund in later years when income is higher. The behavioral finance-based "Save More Tomorrow" strategy is a version of this.

Other more sophisticated schemes would be diversifying the bond portfolio by adding TIPS, international government bonds, and some high quality corporate bonds. This is very much what insurance companies do to fund the promises made in their fixed annuity products.

The lowest-risk low-utility pension scheme can now be contrasted with today's existing pension schemes. Since inflation is such a dominant factor in retirement income, investment return risk and inflation risk have been formally split. Table 1.A organizes the trade-off between risk and utility. The estimates are relative and for framing. They are not absolute or empirically derived. Table 1.A summarizes this.

What is clear from Table 1.A, or any similarly arranged table, is that there is no perfect retirement-income scheme today and trade-offs must be made.

While there is no perfect scheme today, the following questions can be asked and answered:
1. In retirement, is there a default structure for retirement-income that would provide the highest utility to the uninformed investor, and would allow an informed investor to make utility-enhancing additions/changes based on that investor's circumstance and preferences?
2. Can a public benchmark, much like the S&P 500 or Barclays Aggregate Bond Index, be defined and computed for this structure?

Such a structure and index does not exist today, but if it did it could look like the following: a self-liquidating TIPS fund for twenty years (the current maximum maturity for liquid TIPS) matched with a lifetime nominal annuity that starts in twenty years when the TIPS portfolio is depleted. The income from the annuity, beginning in year twenty-one, would be set to match the final expected payment from the TIPS portfolio. This structure would provide lifetime income with minimal counter-party risk, and the first twenty years of the income would be inflation protected. At retirement, control of the majority of the assets is maintained by the retiree.

For example, using rates of the Fall 2010 timeframe, a $100,000 portfolio would be split $86,000 invested in the TIPS portfolio and $14,000 would purchase a deferred annuity. The portfolio would provide twenty years of inflation-protected income with an initial coupon of 5.7% and cash flow of $4,880. By year twenty, at the current break-even inflation rate (2%), the final annual cash flow would be $7,000. The annuity would be purchased to provide annual lifetime nominal income after twenty years of $7,000.

Note that it takes $100,000 of assets to convert into $4,800 of lifetime income that is partially inflation protected. The average 401(k) balance of $56,000, referenced in the Appendix, points out the high risk of undersaving in DC plans.

This TIPS plus deferred annuity is the closest that a retiree can come to lifetime real income with limited counter-party risk while maintaining control over some of the assets for some period of time, and using existing legal structures to transfer work today into future retirement income.

The two parts of this structure—TIPS and the deferred annuity—as well as the combination can be viewed through the risk and utility paradigm. For the second question, could a public index of this Default Retirement Income Scheme be created? The answer is yes, and Section IV is dedicated to this index, which is called the DCDB Index, where DCDB is an acronym for Defined Contribution Default Benchmark.

Before further discussing the index, Table 1.B is built on to show how higher risk-return and higher-flexibility assets can be added to this default scheme. Again, the focus is on retirement income. The goal is a structure that lets individual circumstance drive a higher risk/higher utility asset allocation; but that asset allocation can be measured against an executable low risk/lower utility choice. This is shown in Table 1.C.

The structure of Table 1.C allows trade-offs to be measured and judged. The default option is executable with today's asset vehicles. It is measurable with an index (see Section IV). It is doable in that an individual is capable of executing this option with a minimal burden—including the calculation to split the assets between TIPS and an annuity—and yet gain the baseline utility. Individuals can also choose to add to, or change from, the default scheme if they judge that to be desirable.

Many combinations could be added to Table 1.C, but the structure of the table would not change. The table is built on the TIPS plus deferred annuity structure that comprises the DCDB index, which is now developed in Section IV.

TABLE 1.A

| | | | Risks*: | | | |
|---|---|---|---|---|---|---|
| Schemes: | Savings | Investment returns | Counter party | Longevity | Inflation | Utility*: |
| LRCFMS (Nominal promises and annual accruals) | 1 Saving must occur; calculation risk | 1 In present value terns, most cash flows are matched | 1 Legal claims on a government: T-Bills and Bonds | 1 100 years | 5 Everything is nominal | 3 Limited flexibility; high opportunity costs |
| Social Security (Implicit in this is Medicare as it is both a dominant retirement income need and a claim on the government.) | 2 Underfunded, but multi-generation taxing power | 1 Returns help; taxing power dominates | 2 Governments fail; governments change the rules | 1 | 2 The rules can change; for example, the current move by the Colorado Public Employees trust to decrease the COLA formula | 4 High coverage: Pooling for longevity and investment returns; Inflation protected; Limited flexibility; Counter party risk is low, but not zero. |
| Corporate DB: Defined-Benefit Plan | 3 Most are underfunded; Most rely on risky assets for funding | 2 Ability to take risk; multi-generation investment pooling; Stock, bond holders, and employees all at risk | 2 Companies fail, more often than appreciated | 2 Risk is low as long as the company exists to pool longevity | 5 Retirement income is nominal | 3 Lifetime income, but it is nominal, and it can fail. Currently unavailable to the majority of workers. |
| Defined-Contribution Plan | 5 Overwhelming evidence of undersaving | 5 No returns pooling; Substantial evidence that individuals buy high and sell low | 1 The investor controls the assets | 5 There is no default assets-to-income scheme; annuities are not widely used | Most savers and retirees think and invest in nominal terms; Inflation-protected annuities and TIPS are available | 2 Asset control, flexibility and wide coverage; offset by no pooling and large institutional burdens carried by individuals |

For risk, (1) is low (good), and (5) is high (bad). For utility, (1) is low (bad) and (5) is high (good)

TABLE 1.B

Retirement Scheme: Risk, Utility, Trade-offs

| | | | Risks*: | | | |
|---|---|---|---|---|---|---|
| Schemes: | Savings | Investment returns | Counter party | Longevity | Inflation | Utility: |
| #1. TIPS portfolio | N/A Distribution only | 1 Certainty is high; the goal is income with low risk | 1 A claim on the government, TIPS, is the counter party | 4 (20 years; at 65, expected life is 20 years) | 1 (Inflation protected bonds) | 4 Low risk and inflation protected for 20 years, access to principal; Principal depletes to zero in year 20, some longevity risk; Potential higher income from higher risk-return assets foregone |
| #2. Deferred annuity | N/A Distribution only | N/A | 2 Insurance company, therefore: must stay under the state insurance caps; Offset is that risk is 20 years after retirement and | 1 No longevity risk | 5 There is no inflation-protected asset to invest in past 20 | 4 Deferred lifetime income is nominal; Must rebalance if material changes in inflation arise; Some counter party risk |

TABLE 1.B-continued

Retirement Scheme: Risk, Utility, Trade-offs

Risks*:

| Schemes: | Savings | Investment returns | Counter party | Longevity | Inflation | Utility: |
|---|---|---|---|---|---|---|
| | | | therefore a small percentage of total assets | years | | |
| Lifetime Income Default Benchmark | N/A | 1 Certainty is high; the goal is income with low risk | 2 A claim on government is the main counter party; limited insurance company risk due to time and state pooling schemes | 1 Lifetime income | 3 Inflation protection for 20 years only | 4 Lifetime income, mostly inflation protected, Control of some percent of assets; Some counter party risk |

TABLE 1.C

Risks*:

| Schemes: | Savings | Investment returns | Counter party | Longevity | Inflation | Utility: |
|---|---|---|---|---|---|---|
| DCDB ™ | N/A | 1 Certainty is high; the goal is income with low risk | 2 A claim on government, TIPS, is the counter party | 1 Lifetime income | 3 Inflation protection for 20 years only | 5 Lifetime income, mostly inflation protected, Control of some percent of assets; Some counter-party risk |
| Add equities, in some percentage | N/A Lower savings needed if a given higher expected return is realized | 2 Higher returns come with higher risk | 1 The assets are held by the individual | 3 It is possible to outlive your assets if a minimum income is required, and you put some of these assets at risk | 3 Equities help offset inflation risk, but there is risk of low realized returns and high inflation | ? Determined by individual preference |

*For risk, (1) is low (good) and (5) is high (bad). For utility, (1) is low (bad) and (5) is high (good).

IV. Default Benchmark for Retirement Income Portfolio

Fifty-two million Americans will need to convert $7.3 trillion in assets they hold in IRAs and DC plans into retirement income. These numbers are highly likely to increase as the number of retirees and their assets will grow. In addition, the increasing retirement-income role played by DC plans amplifies the importance of this asset-to-income decision.

Currently, DC plan participants are faced with an incredibly complex task of figuring out for themselves how they would like to distribute the value of their DC account. Participants want to know how to convert DC account balances to real, inflation-protected income. Exacerbating this difficult task is the abrupt stop in accumulation phase of DC plans—due both to the stoppage of work as well as plan provisions forcing distributions. According to the PSCA's 51st Annual Survey of Profit Sharing and 401(k) Plans, almost 100% of the plans offer a lump sum option while some plans (25%) require participants to exit the plan completely.

At retirement, a person is on his/her own, and while significant educational resources are available for plan participants, it is the belief of most experts that current advice and modeling tools are insufficient to truly help participants make the best decision for their particular situation.

Current options include both in-plan and out-of-plan solutions. For example, one option is direct from insurers such as MetLife, Prudential, Genworth, and others. Another option is partnerships with investment/platform providers such as Fidelity, Vanguard, BlackRock, and Hueler. A major limitation is that capital markets are incomplete. One cannot transfer retirement income in a riskless manner, due to inflation, longevity and counter-party issues. This forces a trade-off between risk and utility. A plan sponsor question is how best to help participants weigh these tradeoffs.

In the risk/utility tradeoff there are current shortcomings. For example, participants have little or no context to evaluate alternatives. Additionally, current platform providers' modeling tools are over-reliant on mean/variance optimization ("4% withdrawal rule").

Therefore participants need a benchmark—something that will provide a standard from which to make utility-increasing retirement-income decisions based on the circumstances and preferences of each investor. Other factors that have not been addressed here include taxes, health and medical insurance, such as Medicare coverage status. The key to the DCDB is that this is a starting point from which to make better informed individual decisions.

These investor-specific decisions can range from a 100% nominal lifetime annuity, to a 60/40 equity/bond portfolio, to a laddered TIPS portfolio. The benchmark provides a measured frame of reference to make these retirement-income decisions.

What core economic structures would a default retirement-income benchmark need to meet? There are three:
1. The lowest practical possible counter-party risk achievable
2. Inflation protection for as long as the TIPS market provides
3. Gains from longevity pooling In addition, the default retirement-income benchmark must meet these functional criteria:
1. Doable—using transfer vehicles that exist today—e.g., 20-year TIPS (as the markets change, the index will change.)
2. Executable—any and all participants in 401(k)/IRA plans can individually execute the strategy; it is not constrained by marketplace capacity or a specific set of market conditions or a complexity that only the experts can master.
3. Measurable/Indexable—it is possible to create an index that tracks benchmark components. These components of index income and return of the index are available to the public.

Combining these six criteria defines an embodiment of a Defined Contribution Default Benchmark (DCDB). In one embodiment, this DCDB is made up of two assets and one market-based calculation for asset allocation:

Assets:
A TIPS portfolio structured to pay out income and principal over twenty years
A deferred annuity that begins at the maximum maturity of the effective TIPS market, currently twenty years (insurance company counter-party risk mitigation). A comment on counter-party risk and using nominal deferred annuities that are not backed by US Treasuries in the benchmark is as follows. There is the gain of approximately 30% from longevity pooling. This pooling is offered by insurance companies. It is standard longevity pooling insurance—not capital markets insurance. There is still some counter-party risk as insurance companies cannot perfectly forecast and hedge increases in longevity. This risk is mitigated, and can by managed, by taking advantage of state insurance pools and owning multiple annuities below the level of state guarantees. In the limiting case where everyone's utility drives them to buy a deferred annuity, the ability of the state's insurance pools to truly "insure" a deferred annuity will default to the general taxing power of the state, not a "true" insurance pool. Also, as more and more people seek longevity protection, the pooling improves due to reduction in "anti-selection" issues, e.g., only healthy individuals selecting annuities.

Calculation:
The portfolio allocation to the TIPS portfolio and the deferred annuity is determined by existing market rates for TIPS, deferred annuities, and expected inflation.

In one embodiment, the index is to be published monthly. Section V shows the calculation for the index for one month in the year 2010. The index is computed each month for retirees at age 60 and 65, in certain embodiments. In another embodiment, the index will be computed each month for retirees at age 70 and/or other ages.

The TIPS and deferred annuity combination is the best default option available today that meets the six criteria for a retirement income benchmark. Therefore, the DCDB can be a default option for DC plan participants in distribution.

It is recognized that it is possible today to purchase an inflation-protected lifetime annuity. The annuity does provide the utility of pooling and lifetime inflation-protected income. This is offset by the following risks and costs:
1. Counter-party risk.
2. The requirement that the retiree's portfolio must be irrevocably committed to the annuity and this is typically a large percentage, sometimes 100%, of the retiree's portfolio.
3. Since the active TIPS market currently only goes for twenty years, the counter-party, typically an insurance company, has no way to directly hedge the promise, and this results in both the insurance company and the retiree taking on this risk.

Hence, the best option today is an optimal combination of a deferred annuity and a TIPS portfolio that pays out for twenty years.

Over time, the marketplace is expected to evolve and so too, the retirement income benchmark. For example, insurance companies are the only place where longevity risks can be pooled and managed today. In the future, the capital markets are expected to provide additional pooling solutions to manage this specific risk. Also, the benefits of pooling with annuity products is not a "perfect" solution since some counter-party risk remains as well as additional costs present in insurance company capitalization needs, i.e., the cost of renting the balance sheet of the insurance carrier. While nothing in the real world is "perfect", this combination of TIPS plus a deferred annuity does the best job at meeting the criteria for lifetime income today, and, just as importantly, the benchmark uses market pricing and that can be measured.

Methodology

To determine how much the participant should allocate to TIPS and how much to the deferred annuity, the system applies the expected inflation currently priced into the TIPS marketplace and the current market price of a 20-year deferred annuity. The market price of a deferred annuity is obtained for ages 60 to 70, and for males and females, in certain embodiments. In other embodiments, the market price of a deferred annuity is obtained for ages 55 to 70, and for males and females. Using these inputs, the system simultaneously solves for the income stream that tracks inflation expectations for twenty years, then held is steady for the remainder of the person's lifetime at the level of the inflation adjusted payment in year 20. This is the lifetime income stream—twenty years of inflation-protected income, then a nominal annuity—that is the DCDB.

The calculation can be repeated for ages 60 through 70 by obtaining the market price of the deferred annuity and the expected inflation currently priced into the TIPS marketplace and simultaneously solving for the income stream that tracks inflation expectations for twenty years, then is held steady for the remainder of the person's lifetime at the level of the inflation adjusted payment in year 20.

In an example, for a 65-year-old male, the market pricing of the benchmark in September 2010 would split the portfolio as 88% TIPS and 12% for the annuity. Assuming a $100,000 account balance, the DCDB would show beginning yearly income of $5,220. This is computed by taking the current TIPS payout times the 88% allocation.

substantial portion of his/her portfolio (the TIPS allocation) when retirement begins.

And, just as importantly, the DCDB can be used to measure asset-allocation decisions to take on more risk to gain higher expected returns and income or more decision flexibility. For example, after the TIPS annuity allocation is set and the deferred annuity is purchased (12% at year 2010 rates for a 65-year-old), the retiree may choose to split the remaining 88% into two pieces: TIPS and a global balanced portfolio.

Table 2 shows aspects of the DCDB Index:

TABLE 2

The DCDB Index

| Allocation | Time | |
| --- | --- | --- |
| | Age: 65 to 85<br>88% | Age: 85 (20 years post retirement)<br>12% |
| Components | 20-year self-liquidating TIPS portfolio. Income is coupons plus return of principal. Principal value decreases overtime as principal is returned. The value is zero in year 20. | Deferred annuity starting in year 21. The income level purchased is matched to the expected final coupon of the TIPS portfolio at time of purchase. |
| Current Yield; Distribution Rate | 5.69% (distribution rate) *<br>88% allocation | $6,472 based on current 88% of 5.69% distribution rate and 1.91% annual inflation |
| Annual income $ based $100,000 portfolio, years 1-20 | | |
| Annual income, year 21+ | $5,022 | In year 21: $7,332 |
| Inflation protected? | Yes | No |
| Control of assets? | Yes | No |

The overall TIPS market has a break-even inflation rate of 1.91% over twenty years. So, the best forecast for the final year twenty payment is $7,332. See Section V for this calculation. Note that over the twenty years the principal and income payments are adjusted for inflation. And, at the end of twenty years, the entire balance of the portfolio will have been paid, leaving a balance of zero.

In year twenty one, the deferred annuity begins. In this example, the annuity will pay $7,332 each year for life after the age of 85. This annuity is not inflation protected.

Actual inflation will be different than the expected inflation in the TIPS market at the point of calculation. This method is the best estimate today to use for determining a default-deferred income in twenty years, but the retiree has flexibility to adjust his or her portfolio based on actual inflation.

This methodology can be applied to shorter time periods than 20 years. It can also be applied to an age younger than 65; however, until a liquid TIPS market develops that is longer than the current twenty years, the TIPS portfolio has a maximum life of twenty years. The calculation is also gender specific since the cost of the deferred annuity is different for men and women.

This benchmark solution is doable, executable, and it can be measured with a public index. The benchmark can be used to create an individual portfolio of lifetime retirement that is as inflation protected as possible, realizes the gains from longevity pooling, and allows the retiree to retain control of a How Participants can Use the DCDB Individuals and advisers may use the index any time decisions are made about how to construct a portfolio to generate lifetime retirement income. These decisions can be in the context of how to convert an account balance, e.g., 401(k) or IRA balance, to retirement income, or when a participant in a traditional pension plan needs to make a decision between an annuity within the plan or a lump sum payment.

The DCDB provides the lowest risk alternative for a secure retirement that is currently achievable in the marketplace today. Asset allocation different for the DCDB can be made when the participants believe they can achieve higher utility based on their own needs and risk tolerances.

Below are Three Example Applications of an Embodiment:

1. The participant chooses full annuitization with an insurance company.

a. Participants have the option of annuitizing their 401(k) balance. Should participants do this?

b. Current annuity quotes for age 65—fully indexed annuity—are $5,800 c. Participant trade-off

Retiree Choice:

Does the utility of guaranteed inflation income for life combined with the loss of flexibility of the portfolio and counter-party risk offset loss of inflation-protected income after age 85?

TABLE 3

| | Time | |
|---|---|---|
| | Age: 65 to 85 | Age: 85 (20 years post retirement) |
| | Default: DCDB ™ Benchmark Allocation | |
| | 88% | 12% |
| Components | 20-year self-liquidating TIPS portfolio. Income is coupons plus return of principal. Principal value decreases over time as principal is returned. The value is zero in year 20. | Deferred annuity starting in year 21. The income level purchased is matched to the expected final coupon of the TIPS portfolio at time of purchase |
| Current Yield; Distribution Rate | 5.69% (distribution rate) * 88% allocation | $6,472 based on current 88% of 5.69% distribution rate and 191% annual inflation |
| Annual income $ based $100,000 portfolio | $5,022 | $7,332 |
| Inflation protection | Yes | No |
| Control of assets | Yes, until liquidation is complete | No |
| Portfolio choice | Lifetime Inflation-Protected Annuity | |
| Allocation Current Yield; Distribution Rate | 100% | 100% |
| Annual income $ based $100,000 portfolio, years 1-20 | $4,856 | $7,090 (if inflation is 1.91% p.a.) |
| Inflation Protection | Yes | Yes |
| Control of assets | No | No |

2. Participant chooses to invest in risky assets, e.g., target date funds
  a. Participants can choose to stay invested in the target date funds that will manage the "glide path" and asset allocation
  b. Current retirement modeling calls for 3.1% portfolio yield
  c. Participant trade-off Is the utility from target date funds combined with complete ownership of assets that are expected to grow in value (not deplete) but with the risk of loss sufficient to overcome the DCDB that provides higher income per year over the target-date portfolio yield and has almost no inflation risk, close-to-no asset risk, and protects against longevity risk?

TABLE 4

| | Time | |
|---|---|---|
| | Age: 65 to 85 | Age: 85 (20 years post retirement) |
| | Default: DCDB ™ Benchmark Allocation | |
| | 88% | 12% |
| Components | 20-year self-liquidating TIPS portfolio. Income is coupons plus return of principal. Principal value decreases over time as principal is returned. The value is zero in year 20. | Deferred annuity starting in year 21. The income level purchased is matched to the expected final coupon of the TIPS portfolio at time of purchase |
| Current Yield; Distribution Rate | 5.69% (distribution rate) * 88% allocation | $6,320 based on current 88% of 5.6% distribution rate and 1.8% annual inflation |
| Annual income $ based $100,000 portfolio | $5,022 | $7,332 |
| Inflation protected | Yes | |
| Control of assets | Yes, until liquidation is complete | No |
| Portfolio Allocation | Target-date fund | |
| Allocation | 100% | 100% |
| Current Yield; Distribution Rate | 3.1% | |

TABLE 4-continued

| | Time | |
|---|---|---|
| | Age: 65 to 85 | Age: 85 (20 years post retirement) |
| | Default: DCDB ™ Benchmark Allocation | |
| | 88% | 12% |
| Annual income $ based $100,000 portfolio, years 1-20 | $3,100 | Uncertain |
| Inflation protected? | No | No |
| Control of assets? | Yes | No |

3. Participant has to choose between lump sum payment from a DB plan or an annuity within the plans
   a. Many DB plans (especially cash balance plans) include a lump sum option. How can participants evaluate whether or not to take a lump sum?
   b. Participant can choose the following:
      i. $100,000 lump sum (lump sum factor/annuity conversion based on sample DB plan client using year 2010 factors—author's calculation)
      ii. $6,811 annuity (fixed, no COLA) from DB plan
   c. Participant Tradeoff
      i. Participant can evaluate tradeoff between the two options when compared to the DCDB
      ii. Some counter—party risk remains if select the DB annuity—although PBGC provides certain guarantees for most DB plans
      iii. While longevity risk is managed in DB annuity, typically no inflation protection is provided

TABLE 5

| | Time | |
|---|---|---|
| | Age: 65 to 85 | Age: 85 (20 years post retirement) |
| | Default: DCDB ™ Benchmark Allocation | |
| | 88% | 12% |
| Components | 20-year self-liquidating TIPS portfolio. Income is coupons plus return of principal. Principal value decreases over time as principal is returned. The value is zero in year 20. | Deferred annuity starting in year 21. The income level purchased is matched to the expected final coupon of the TIPS portfolio at time of purchase |
| Current Yield; Distribution Rate | 5.69% (distribution rate) * 88% allocation | $6,472 based on current 88% of 5.6% distribution rate and 1.91% annual inflation |
| Annual income $ based $100,000 portfolio | $5,022 | $7,332 |
| Inflation protected | Yes | No |
| Control of assets | Yes, until liquidation is complete | No |

| Portfolio Allocation | Nominal Lifetime Annuity | |
|---|---|---|
| Allocation | 100% | 100% |
| Annual income $ based $100,000 portfolio, years 1-20 | $6,811 | $6,811 |
| Inflation protected? | No | No |
| Control of assets? | No | No |

The DCDB provides a market-based income curve providing the lowest possible risk income stream to a retiree. Just as the swap curve provides a market-based measure of trading cash flows, the index provides a market-based reference point for better decision making by the retiree. A retiree can better evaluate alternatives based on the real risks (inflation, longevity and counter-party) faced during the de-accumulation phase rather than the risks used in traditional mean/variance models on standard deviation of return. This is a large and positive step forward in helping all 401(k)/IRA plan participants.

Process States

Figure 2:
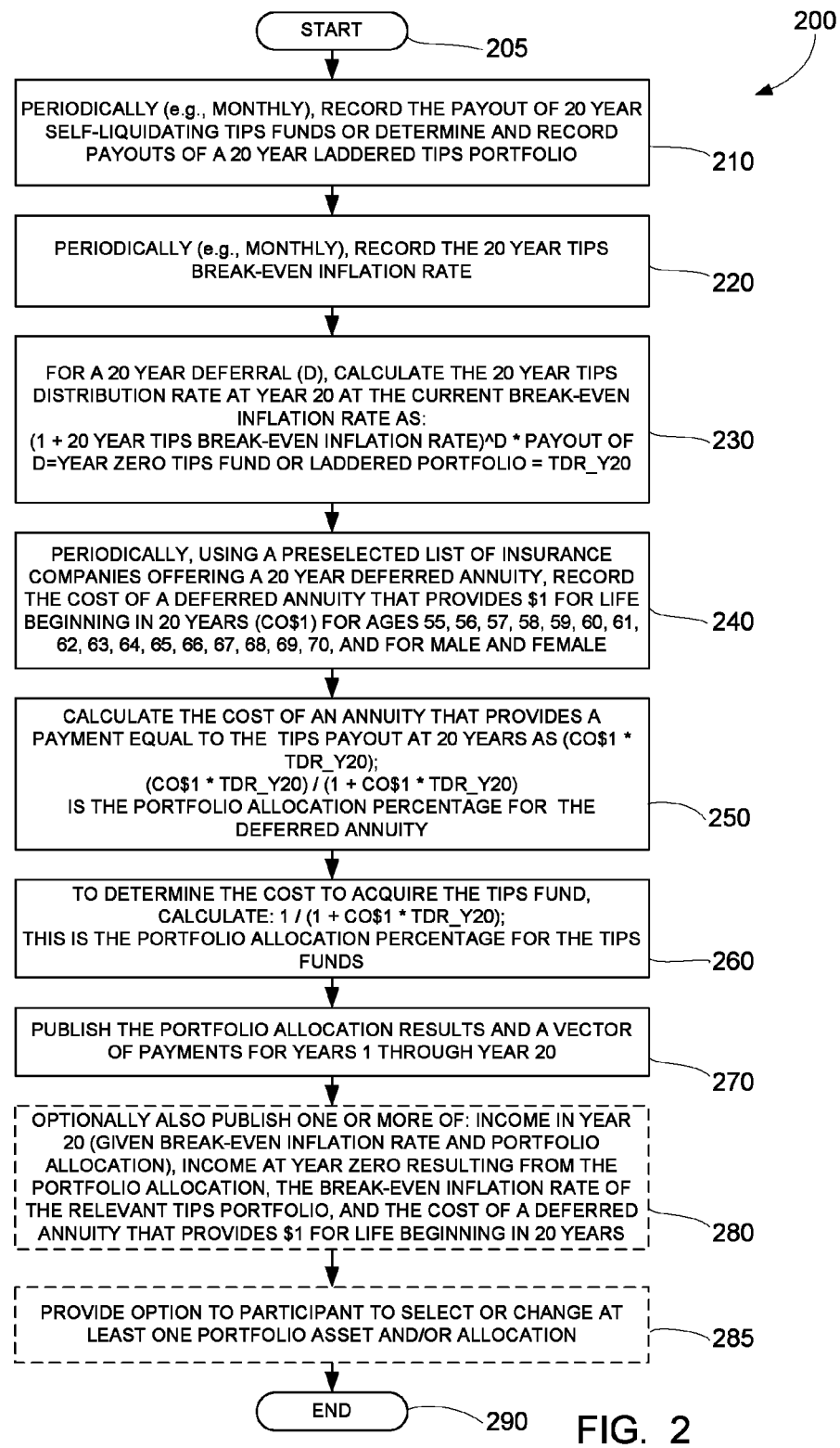
FIG. 2 is a flow diagram of an example of one embodiment of a process operating on the system shown in FIG. 1A or 1B.

Referring to FIG. 2, the following states of a process 200 are described for one embodiment of determining the DCDB benchmark using 20 year self-liquidating TIPS funds or a 20 year laddered TIPS portfolio and a 20 year deferred annuity. In FIG. 2, the number of years of annuity deferral is 20 years. In other embodiments, other time periods, such as 10 year or 30 year TIPS and annuities, for example, could be used.

Beginning at a start state 205, process 200 moves to state 210 to periodically (e.g., monthly), record the payout of 20 year self-liquidating TIPS funds or determine and record payouts of a 20 year laddered TIPS portfolio. Proceeding to state 220, process 200 periodically (e.g., monthly), records the 20 year TIPS break-even inflation rate. In some embodiments, this is based on information such as from a publicly available source, e.g., Bloomberg. The break-even inflation rate is further discussed below. Continuing at state 230, for a 20 year deferral (D), process 200 calculates the 20 year TIPS distribution rate at year 20 at the current break-even inflation rate as (1+20 year TIPS break-even inflation rate)^D*payout of D=year zero TIPS fund or laddered TIPS portfolio=TDR_Y20. Proceeding to state 240, process 200 periodically, using a preselected list of insurance companies offering a 20 year deferred annuity, records the cost of a deferred annuity that provides $1 for life beginning in 20 years, which is referred to as CO$1, for each year of ages 55 through 70, and for males and for females.

Advancing to state 250, process 200 calculates the cost of an annuity that provides a payment equal to the TIPS payout at 20 years as (CO$1*TDR_Y20). (CO$1*TDR_Y20)/(1+CO$1*TDR_Y20) is the portfolio allocation percentage for the deferred annuity. Moving to state 260, to determine the cost to acquire the TIPS fund, process 200 calculates the value of 1/(1+CO$1*TDR_Y20), which is the portfolio allocation percentage for the TIPS funds. Continuing at state 270, process 200 publishes the portfolio allocation results via the network and a vector for payments for years one through year 20. In certain embodiments the payout is an annual amount for each $100,000 invested. In this description $1 is used in the discussion of the process, so the equivalent numbers for the example vector shown in Table 6 below is $0.05022 or 5.022% for year one.

Optionally at state 280, process 200 also publishes one or more of: income in year 20 (given the break-even inflation rate and portfolio allocation), income at year zero resulting from the portfolio allocation, the break-even inflation rate of the relevant TIPS portfolio, and the cost of a deferred annuity that provides $1 for life beginning in 20 years. Proceeding to optional state 285, process 200 provides an option to the participant to select or change at least one portfolio asset and/or allocation. Process 200 completes at an end state 290.

In certain embodiments, the above states are repeated for different maximum maturities of liquid TIPS and the availability of matching deferred annuities and/or different retirement ages of the participants and/or for males and females. Therefore, the DCDB index can be an index series based on these identified calculations.

In certain embodiments, a vector of payments is computed. An example vector of payments for a 65 year-old male as of Sep. 30, 2010 is shown in Table 6 below.

process 300 periodically (e.g., monthly), records the D year TIPS break-even inflation rate. In some embodiments, this is based on information such as from a publicly available source, e.g., Bloomberg. The break-even inflation rate is further discussed below. Advancing to a state 330, process 300 for a D year deferral, calculates the TIPS distribution rate at year D at the current break-even inflation rate as: (1+D year TIPS break-even inflation rate)^D*payout of D=zero year TIPS fund or laddered portfolio=TDR_YD. Continuing at state 340, periodically, using a preselected list of insurance companies offering a D year deferred annuity, process 300 records the cost of a deferred annuity that provides $1 for life beginning in D years, which is referred to as CO$1, for each year of ages 55 through 70, and for males and for females.

Moving to a state 350, process 300 calculates the cost of an annuity that provides a payout equal to the tips payout at d years as (CO$1*TDR_YD). Then (CO$1*TDR_YD)/(1+CO$1*TDR_YD) is the portfolio allocation percentage for the deferred annuity. Moving to state 360, to determine the cost to acquire the TIPS fund, process 200 calculates the value of 1/(1+CO$1*TDR_YD), which is the portfolio allocation percentage for the TIPS funds. Continuing at state 370, process 300 publishes the portfolio allocation results via the network and a vector for payments for years one through year 20. Optionally at state 380, process 200 also publishes one or more of: income in year D (given the break-even inflation rate and portfolio allocation), income at year zero resulting from the portfolio allocations, the break-even inflation rate of the relevant TIPS portfolio, and the cost of a deferred annuity that provides $1 for life beginning in D years. Advancing to an optional state 385, process 300 provides an option to the participant to select or change at least one portfolio asset and/or allocation. Process 300 completes at an end state 390.

Other ages can be used in further embodiments. In certain embodiments, the above states are repeated for different maximum maturities of liquid TIPS and the availability of matching deferred annuities and/or different retirement ages of the participants and/or for males and females. Therefore, the DCDB index can be an index series based on these identified calculations.

In other embodiments, other financial vehicles could be used in addition to the TIPS and annuities.

TABLE 6

The DCDB for a 65-Year-Old Male as of Sep. 30, 2010*

| Year | 1 | 2 | 3 | 4 | 5 | 6 | 7 | 8 | 9 | 10 | 11 | 12 |
|---|---|---|---|---|---|---|---|---|---|---|---|---|
| Payout ($) | 5022 | 5118 | 5216 | 5315 | 5417 | 5520 | 5626 | 5733 | 5843 | 5954 | 6068 | 6184 |
| Year | 13 | 14 | 15 | 16 | 17 | 18 | 19 | 20 | 21 | 22 | 23 | 24 ... |
| Payout ($) | 6301 | 6421 | 6544 | 6669 | 6796 | 6926 | 7058 | 7193 | 7193 | 7193 | 7193 | 7193 ... |

*Payout is annual amount per $100,000 invested.

Note that the vector in Table 6 can be characterized by only 3 numbers: the initial payout, the inflation rate during the laddered-TIPS or inflating period, and the length in years of the inflating period. The DCDB vector for a 65-year old man as of Sep. 30, 2010 can thus be written (5022, 1.91%, 20). Adding in the portfolio weight of the annuity, x, fills in the picture: (5022, 1.91%, 20, 11.716%); only one weight is needed since the other, that of TIPS, is (1 − x). These short-form expressions are useful in reporting the benchmark, which would otherwise become quite space-intensive.

Figure 3:
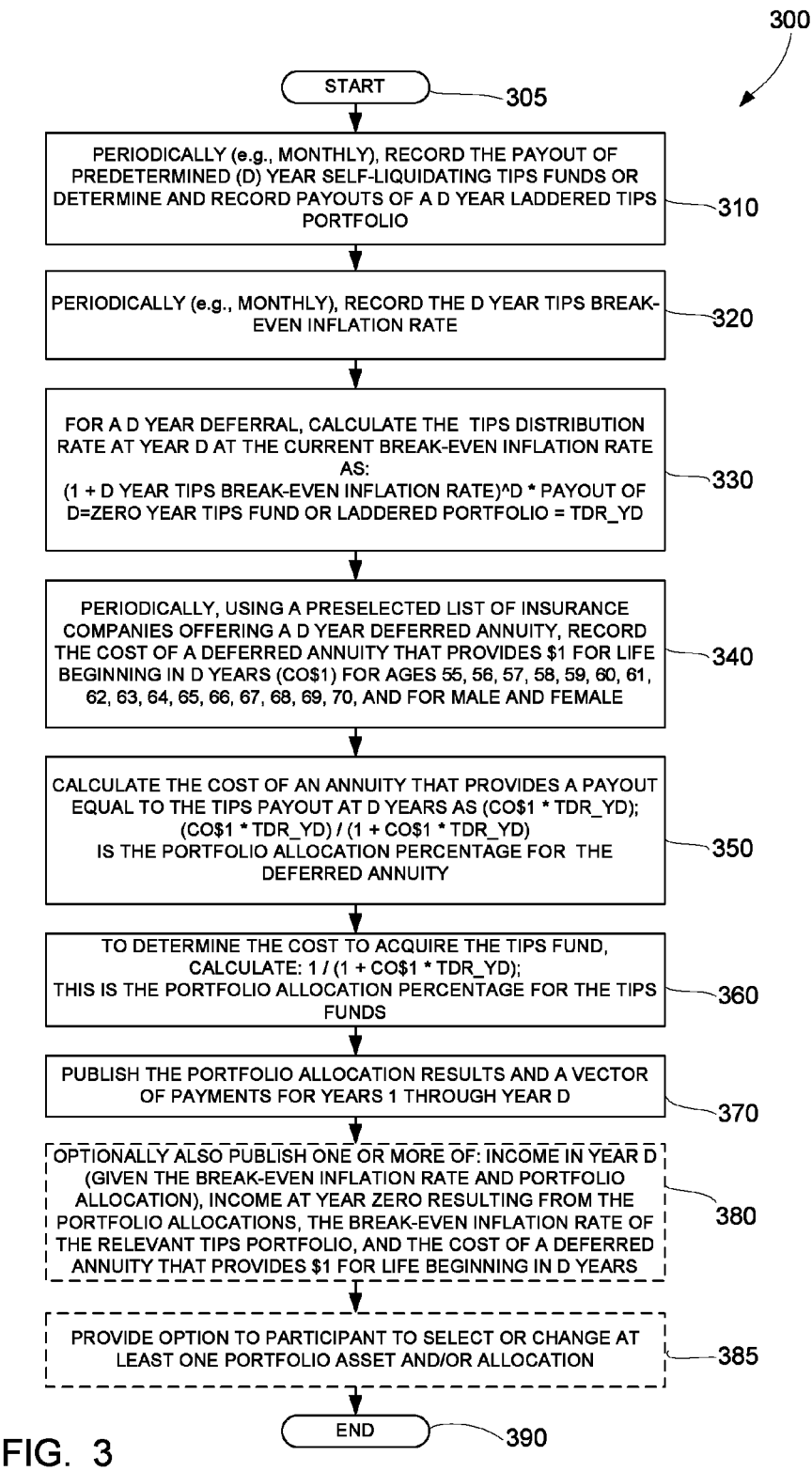
FIG. 3 is a flow diagram of an example of another embodiment of a process operating on the system shown in FIG. 1A or 1B.

Referring to FIG. 3, the states for a process 300 in determining the DCDB benchmark for a predetermined number of years are described. In FIG. 3, the number of years of annuity deferral is represented by D years. Beginning at a start state 305, process 300 moves to a state 310 and periodically (e.g., monthly), records the payout of predetermined (D) year self-liquidating TIPS funds or determines and records payouts of a D year laddered TIPS portfolio. Proceeding to a state 320, In certain embodiments the benchmark is generated on a monthly basis as described below. In other embodiments, the benchmark is generated more frequently, such as daily, weekly or bi-weekly, for example. In yet other embodiments, the benchmark is generated less frequently than monthly, such as quarterly or bi-monthly, for example. In certain embodiments, the benchmark steps may be performed at the same time. In other embodiments, the steps may be performed at different times. In other embodiments, the steps may be performed in a different order.

In certain embodiments, the break-even inflation rate is (TIPS yield at D years)—(Fixed yield at D years). This provides the inflation rate at which the instruments "break-even." For the acts below, see the cells in the spreadsheet of Table 7 (with formulas) and Table 8 (with results).

1. Each month record the payout of 20 year self-liquidating TIPS funds or determine and record the payout of a 20 year laddered TIPS portfolio. Enter in cell D14
2. Each month record the 20 year TIPS break-even inflation rate (based on information such as from a publicly available source, e.g., Bloomberg). Enter in cell D15
3. Each month survey the approved list of Insurance companies offering a 20 year deferred annuity. Record the cost of $1 for life beginning in 20 years in cell D21
4. Enter the date in cell D10
5. Enter the number of deferral years (20) in cell D11
6. Index Results:
    a. Index allocations to TIPS and the deferred annuity are in cells D6 and D7
    b. The calculation is in cells D25 to D27
    c. Column F is an example for a $100,000 portfolio The mathematics rule for setting the allocation is as follows: This is embedded in column D of the spreadsheet. Income in year 20, $Y(20)=[(1-X)*TIPS\ coupon\ Y(1)*(1+inflation)^{20}]$, where X is the Annuity allocation. The cost to buy Y(20) income for life beginning in year 21 is 1.5975. For every Y(20) dollar, there is a 1.5975*annuity allocation=> $[(1-X)*TIPS\ coupon\ Y(1)*(1+break\ even\ inflation)^{20}]=[1.5975X]$; solve for X. The calculation can be seen in the spreadsheet calculations of Table 7 (with formulas) and Table 8 (with results).

TABLE 7

| 1/A | B | C | D | E | F |
|---|---|---|---|---|---|
| 2 | DCDB | | | | |
| 3 | Retirement Income Benchmark | | | | |
| 4 | Enter shaded fields | | | | Example Portfolio: 100000 |
| 5 | Portfolio Allocation at Retirement: | | | | Example |
| 6 | | | TIPS Fund | = D26 | = F5 * D6 |
| 7 | | | Deferred Annuity | = D25 | = D7 * F5 |
| 8 | | | | | |
| 9 | Age | | = Age | | = D9 |
| 10 | Calculation Date | | 40471 | | = D10 |
| 11 | TIPS payments, number years | | 20 | | = D11 |
| 12 | 1st nominal annuity payment | | year 21 | | = D12 |
| 13 | | | | | |
| 14 | 20 year TIPS distribution rate, year 1 | | 0.0569 | | = D14 * D6 * F5 |
| 15 | 20 year TIPS break-even inflation rate | | 0.0191 | | = D15 |
| 16 | 20 year TIPS distribution rate, year 20 | | =(1 + D15)^D11 * D14 | | = D14 * D6 * F5 |
| 17 | (at current break-even inflation rate) | | | | Payment is TIPS |
| 18 | | | | | = D6 |
| 19 | | | | | of TIPS dist. rate |
| 20 | | | | | |
| 21 | 20 year Deferred Annuity Price | | 1.6 | | = D21 |
| 22 | (current cost $1 per year for life, | | | | |
| 23 | beginning in year 21) | | | | |
| 24 | | | | | |

TABLE 7-continued

| | | | | |
|---|---|---|---|---|
| 25 | Annuity cost to earn year 21 TIPS payout | = (D21 * D16) / (1 + D21 * D16) | | = F7 / F5 |
| 26 | Cost to acquire TIPS fund | = 1 / (1 + D21 * D16) | | = F6 / F5 |
| 27 | Total Portfolio | = D26 + D25 | | = F26 + F25 |

TABLE 8

| 1/A | B | C | D | E | F |
|---|---|---|---|---|---|
| 2 | DCDB | | | | |
| 3 | Retirement Income Benchmark | | | | |
| 4 | Enter shaded fields | | | | Example Portfolio: $100,000 |
| 5 | Portfolio Allocation at Retirement: | | | | Example |
| 6 | | | TIPS Fund | 88% | $88,268 |
| 7 | | | Deferred Annuity | 12% | $11,732 |
| 8 | | | | | |
| 9 | Age | | | 0 | — |
| 10 | Calculation Date | | | 10/20/2010 | 10/20/2010 |
| 11 | TIPS payments, number years | | | 20 | 20 |
| 12 | 1st nominal annuity payment | | | year 21 | year 21 |
| 13 | | | | | |
| 14 | 20 year TIPS distribution rate, year 1 | | | 5.69% | 5,022 |
| 15 | 20 year TIPS break-even inflation rate | | | 1.91% | 1.91% |
| 16 | 20 year TIPS distribution rate, year 20 | | | 8.31% | 7,332 |
| 17 | (at current break-even inflation rate) | | | | Payment is TIPS |
| 18 | | | | | 88% |
| 19 | | | | | of TIPS |
| 20 | | | | | dist. rate |
| 21 | 20 year Deferred Annuity Price | | | 1.60 | |
| 22 | (current cost $1 per year for life, | | | | 1.60 |
| 23 | beginning in year 21) | | | | |
| 24 | | | | | |
| 25 | Annuity cost to earn year 21 TIPS payout | | | 0.12 | 0.12 |
| 26 | Cost to acquire TIPS fund | | | 0.88 | 0.88 |
| 27 | Total Portfolio | | | 1.00 | 1.00 |
| 28 | note: portfolio is scaled to $1 in year zero, age 65 | | | | |

Publication of Benchmark and Family of Benchmarks

In certain embodiments, the percentage of the portfolio allocation for the deferred annuity and the percentage of the portfolio allocation for the TIPS funds are published, such as via the network. In one embodiment, the publication occurs after the allocations are determined on a periodic schedule as described above. In addition to the percentage allocations for the deferred annuity and the TIPS funds, other data can be optionally published. For example, one or more of a) the income in year D, given a stated break-even inflation rate and the portfolio allocation, b) income at year zero resulting from the portfolio allocation, c) the break-even inflation rate of the relevant TIPS portfolio, and d) the cost of a deferred annuity that provides $1 for life beginning in D years are published. In certain embodiments, the income in year D, given the stated break even inflation rate and portfolio allocation, and the income at year zero resulting from the allocation are calculated. In certain embodiments, the break-even inflation rate of the relevant TIPS portfolio, and the cost of a deferred annuity that provides $1 for life beginning in D years are discovered using other published resources, for example. The publication of the percentage allocations for the deferred annuity and the TIPS funds, the payout vector, and the one or more items a) to d) can be, for example, on one or more websites or documents (such as a newsletter), where the user is a member or client of a particular company, or the publication can be on websites and/or publications open to anyone of the public.

In other embodiments, a family of benchmarks is developed and published periodically. For example, one or more of the items identified in the previous paragraph is generated and published for both males and females, and/or different ages of the participant (e.g., 55, 56, 57, 58, 59, 60, 61, 62, 63, 64, 65, 66, 67, 68, 69 and 70 years old), and/or different numbers of years for the deferment of the annuity (e.g., 10, 20 and 30 year deferred annuities) and/or different number of years for the TIPS fund or portfolio. In one embodiment, the percentage allocations for the deferred annuity and the TIPS funds, the income in year D (given a stated break-even inflation rate and the portfolio allocation), the income at year zero resulting from the portfolio allocation, the break-even inflation rate of the relevant TIPS portfolio, and the cost of a deferred annuity that provides $1 for life beginning in D years are generated or determined and then published for every permutation of gender, a set of selected ages for the participant, and a selected set of years of deferment for the annuity.

Additional Embodiments

Figure 4:
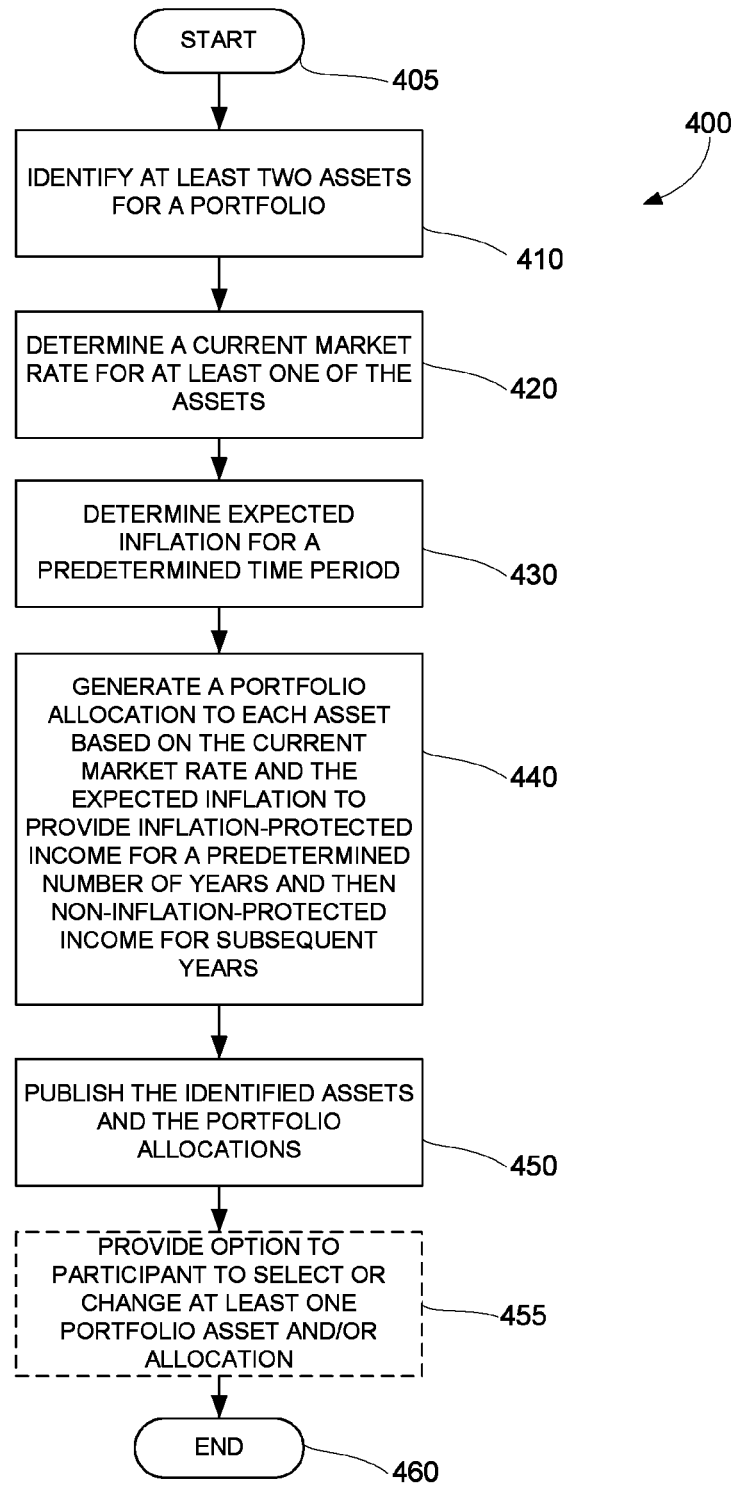
FIG. 4 is a flow diagram of an example of another embodiment of a process operating on the system shown in FIG. 1A or 1B.

Referring to FIG. 4, the following states of a process 400 illustrate another embodiment of determining the DCDB benchmark. Beginning at a start state 405, process 400 moves to a state 410 and identifies at least two assets for a portfolio. Suitable assets for the portfolio have been previously discussed above. Proceeding to a state 420, process 400 determines a current market rate for at least one of the assets. Advancing to a state 430, process 400 determines an expected inflation for a predetermined time period. Moving to a state 440, process 400 generates a portfolio allocation to each asset based on the current market rate and the expected inflation to provide inflation-protected income for a predetermined number of years and then non-inflation-protected income for subsequent years. Proceeding to a state 450, process 400 publishes information about the identified assets and the corresponding portfolio allocations. Optionally, other information such as described above in conjunction with the descriptions for FIGS. 2 and 3 can also be published. Advancing to an optional state 455, process 400 provides an option to the participant to select or change at least one portfolio asset and/or allocation. Process 400 completes at an end state 460.

Figure 5:
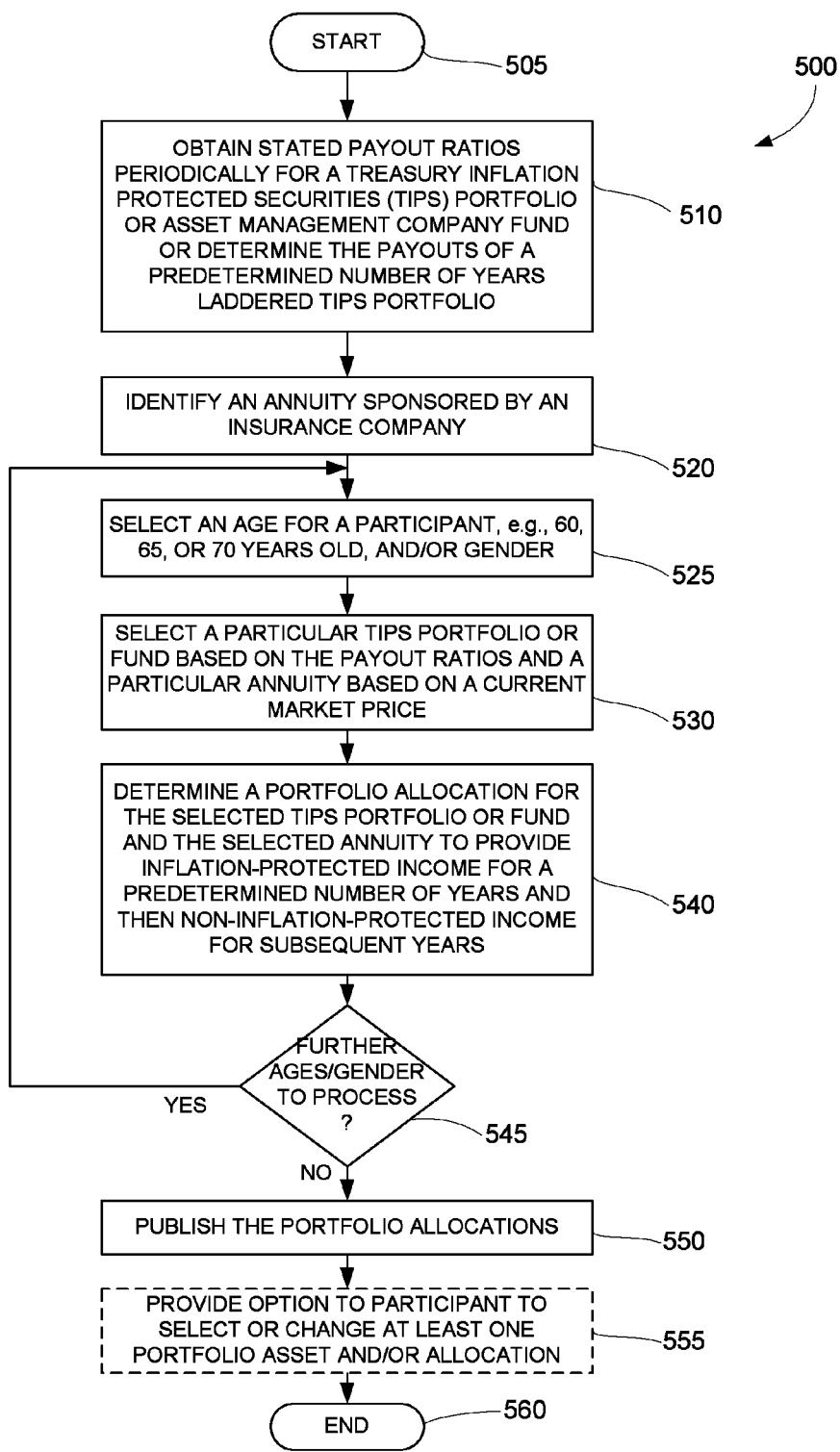
FIG. 5 is a flow diagram of an example of yet another embodiment of a process operating on the system shown in FIG. 1A or 1B.

Referring to FIG. 5, the following states of a process 500 illustrate yet another embodiment of determining the DCDB benchmark. Beginning at a start state 505, process 500 moves to a state 510 and obtains stated payout ratios periodically for a treasury inflation protected securities (TIPS) portfolio or asset management company fund or determines the payouts of a predetermined number of years laddered TIPS portfolio. Continuing at a state 520, process identifies an annuity sponsored by an insurance company, in one embodiment. Proceeding to a state 525, where a loop of several states is performed for one or more starting ages of a participant, e.g., age 60 through 70 and/or the gender of the participant. In other embodiments, other ages can be used. For a first pass through the loop, a female at age 65 can be used, for example. Moving to a state 530, process 500 selects a particular TIPS portfolio or fund based on the payout ratios and a particular annuity based on a current market price. Advancing to state 540, process 500 determines a portfolio allocation for the selected TIPS portfolio or fund and the selected annuity to provide inflation-protected income for a predetermined number of years and then non-inflation-protected income for subsequent years. Moving to a decision state 545, process 500 determines if additional ages and/or gender are to be processed at states 525, 530 and 540. If so, process moves to state 525 where another age and/or gender is used for the subsequent states. However, if decision state 545 determines that no further ages and/or gender are to be processed, process 500 advances to a state 550 and publishes information about the selected assets and the corresponding portfolio allocations for each age and/or gender that was processed. Optionally, other information such as described above in conjunction with the descriptions for FIGS. 2 and 3 can also be published. Advancing to an optional state 555, process 500 provides an option to the participant to select or change at least one portfolio asset and/or allocation. Process 500 completes at an end state 560.

V. Default Benchmark Example

The DCDB

Participants exposed to the DCDB can make utility-enhancing decisions based on their own particular situations.

How much to annuitize—faced with the question of annuitizing a 401(k) balance, the benchmark highlights the tradeoff between increased counter-party risk with possible higher income Continue to invest in 401(k) plan's target date fund for retirees—does the increased utility of possible higher income outweigh the increased risk of inflation/asset risk and increased longevity risk.

Build a customized higher expected return, higher risk portfolio—a portfolio tailored to their preferences.

Definition and Process

This description focuses on a retiree at age 65. Note that benchmarks for other ages will vary. However, since the vast majority of the assets are deployed during the first twenty years in an age-independent manner, e.g., a self-depleting TIPS portfolio—the differences are less than might be expected. For example, for a retiree at age 70, the benchmark may be 92% TIPS and 8% deferred annuity, and for a retiree at age 60, the benchmark may be 82% TIPS and 18% deferred annuity. This discussion will start with the three risks participants face, namely:

Inflation,

Longevity,

Counter-party.

The first issue is how to prioritize these risks given today's marketplace. Since we are not going to be able to simultaneously solve for the lowest risk and meet all three, one needs to work through what is available in the marketplace today in a riskless way, and then only take on risk where a riskless transfer vehicle is not available. Based on this methodology and today's marketplace, inflation risk can be reduced for the first twenty years using TIPS. The U.S. Treasury has issued longer-dated TIPS—up to thirty years—however; the issuance was small in total dollars. For the purposes of this description, the effective TIPS availability has been limited to twenty years.

Using TIPS for the first twenty years also significantly helps with longevity risk. According to current mortality tables, a man aged 65 is expected to live for another nineteen years and females, another 21 years (2010 IRS Generational Mortality—author calculation).

To manage the longevity risk further, the insurance marketplace is available; however, this introduces counter-party risk. While not optimal, this counter-party risk is reduced from the participant perspective since it covers only after twenty years. It can further be reduced by observing any state guarantee limits. For the DCDB, quotes are received from annuity providers in the U.S. for a twenty-year deferred annuity. This annuity would provide lifetime, nominal coverage for a participant—starting at age 85.

The DCDB combines the two products into one income stream—producing an inflation-protected income stream for the first twenty years, plus a lifetime guaranteed payment starting after twenty years.

Solving the mathematics at August 2010 market prices produces the following results in Table 9:

TABLE 9

DCDB Example

| Retirement Income Benchmark | | Example Portfolio: |
|---|---|---|
| Portfolio Allocation at Retirement: | | $100,000 |
| TIPS Fund | 88% | $ 88,273 |
| Deferred Annuity | 12% | $ 11,727 |
| Age | 65 | 65 |
| Calculation Date | Aug. 1, 2010 | Aug. 1, 2010 |
| TIPS payments, number years | 20 | 20 |
| 1st nominal annuity payment | year 21 | year 21 |
| 20 year TIPS distribution rate, year 1 | 5.69% | 5,027 |
| 20 year TIPS break-even inflation rate | 1.91% | 1.91% |
| 20 year TIPS distribution rate, year 20 | 8.32% | 7,031 |
| (at current break-even inflation rate) | | Payment is TIPS 88% of TIPS dist. rate |
| 20 year Deferred Annuity Price | 1.60 | 1.60 |
| (current cost of $1 per year for life, beginning in year 21) | | |
| Annuity cost to earn year 21 TIPS payout | 0.12 | 0.12 |
| Cost to acquire TIPS fund | 0.88 | 0.88 |
| Total Portfolio | 1.00 | 1.00 | note:
portfolio is scaled to $1 in year zero, age 65

This methodology can be applied to shorter time periods than 20 years. It can also be applied to an age younger than 65; however, until a liquid TIPS market develops that is longer than the current twenty years, the TIPS portfolio has a maximum life of twenty years.

The calculation is gender specific since the cost of the deferred annuity is different for men and women.

The index is an index series: The DCDB index series for men and women, for combinations of retirement at ages and the maximum maturity of liquid TIPS and the availability of matching deferred annuities.

VI. Conclusion

Many past retirement systems difficulties and failures, at their core, are attributable to ignoring the connection between the benefits promised and the legal/investment transfer vehicles. All retirement systems stakeholders—participants, employers, taxpayers, regulators and financial services firms—are encouraged to directly tie promises made with existing legal/investment transfer vehicles and market prices.

When labor and pay negotiations, and investment product offerings, are moved off this strict requirement of a direct promise/transfer vehicle paradigm, all participants can be, and should be, aware of where the risks lie. Doing so will enable market participants to understand the true cost of risk—and encourage the capital markets to develop products and markets to find the most cost-efficient manner to hedge these risks.

The goal with the Defined Contribution Default Benchmark (DCDB) is for it to become a publicly available, investable option for the DC marketplace. Participants would be able to see how alternative distribution options compare to the DCDB—and make utility maximization decisions around it.

Retirees can choose a low-risk lifetime income with longevity pooling and a high degree of inflation protection, or they can choose options that better suit their individual needs and circumstances. And they can do so in an informed and measured manner.

Various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, e.g., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Appendix

Failures

Pensions fail in three ways. In the first, the counter-party fails. In the second, the counter-party has the right to change the rules, and it does so. In the third, the structure itself is deficient. In this section, we will review some examples of each of these types of failure.

Counter-Party Failures—Governments Fail, and then so do Pensions

In 1914, it took four German marks to purchase a US dollar. By November 1923, it took 630 billion marks to purchase a US dollar. The German hyperinflation, requiring thirty paper mills just to print money, consumed the German economy and with it all the savings and pensions of civil servants, doctors, teachers, and professors—the "backbone of Germany" (Ahamed, Liaquat, *Lords of Finance* (New York: The Penguin Press, 1987, 120-121) and (Chernow, Ron, *The House of Morgan*, (New York, The Atlantic Monthly Press, 1990, page 249). A catastrophic failure occurred for any pensioner relying on a fixed nominal pension.

The inflation-induced losses are not restricted to 1923 Germany. Since 1900, inflation episodes of 400% and more occurred in Austria, Greece, Hungary, Italy, Poland, Russia, Argentina, Bolivia, Brazil, and Chile (Reinhart, Carmen M. and Kenneth S. Rogoff, This Time is Different, New Jersey: Princeton University Press, 2009, page 186). The point here is that even pension schemes with a close-to-unconditional promise of a government have counter-party risk because governments can and do fail—and, they typically fail in a conflagration of inflation that decimates the economy, savings, and pensions.

Counter-Party Failures—Companies Fail

On Friday, Mar. 28, 1980, after seventy-five years of making steel for International Harvester tractors and equipment, Wisconsin Steel closed its doors and 3,400 steelworkers lost their jobs (Brown, Terry, "The Closing of Wisconsin Steel", *The Chicago Tribune*, Mar. 28, 1980). On May 31, 1980, the Wisconsin Steelworkers' pension plan ended in "termination". On Dec. 31, 1981, the Pension Benefit Guarantee Corporation (PBGC) assumed responsibility for the plan, with a maximum monthly pension payment of $1,261 for those age 65, well below the pension promises of the now-defunct Wisconsin Steel (PBGC: http://www.pbgc.gov/workers-retirees/find-your-pension-plan/PlanPage/plan_3122200.html and http://www.pbgc.gov/workers-retirees/benefits-information/content/page789.html).

Much like the failure of Studebaker, which led to the Employment Retirement Income Security Act (ERISA) in 1974, the failure of Wisconsin Steel shows the counter-party risk of almost all DB pension schemes.

It is an observable economic fact that even in a dynamic, growing economy companies do not last forever. In fact, as Table 10 shows, the correct expectation is that over a long period of time companies will fail, will merge, and will markedly change as they adapt to a growing economy. This economic fact of life has a direct implication for DB pensions: If the pension promises are not properly funded, the employee has material counter-party risk.

TABLE 10

(Cox, Michael, Richard Allen, "The Churn Among Firms", *Federal Reserve Bank of Dallas*, January/February 1999): America's Top Twenty

| Rank | 1917 | 1945 | 1967 | 1987 | 1998 (August) |
|---|---|---|---|---|---|
| 1 | U.S. Steel | AT&T | IBM | IBM | General Electric |
| 2 | AT&T | General Motors | AT&T | Exxon | Microsoft |
| 3 | Standard Oil of New Jersey | DuPont | Kodak | General Electric | Coca-Cola |
| 4 | Bethlehem Steel | Standard Oil of New Jersey | General Motors | AT&T | Exxon |
| 5 | Armour & Co. | General Electric | Standard Oil of New Jersey | General Motors | Merck |
| 6 | Swift & Co. | Union Carbide | Texaco | DuPont | Wal-Mart |
| 7 | International Harvester | Humble Oil & Refining | Sears, Roebuck | Ford | Pfizer |

TABLE 10-continued (Cox, Michael, Richard Allen, "The Churn Among Firms", *Federal Reserve Bank of Dallas*, January/February 1999): America's Top Twenty

| Rank | 1917 | 1945 | 1967 | 1987 | 1998 (August) |
|---|---|---|---|---|---|
| 8 | DuPont | Sears, Roebuck | General Electric | Merck | Intel |
| 9 | Midvale Steel & Ordinance | U.S. Steel | Polaroid | Amoco | IBM |
| 10 | U.S. Rubber | Texas Co. | Gulf Oil | Digital Equipment | Procter & Gamble |
| 11 | General Electric | Coca-Cola | DuPont | Philip Morris | Phillip Morris |
| 12 | International Mercantile Marine | Standard Oil of Indiana | Xerox | Chevron | Bristol-Myers Squibb |
| 13 | American Smelting & Refining | Standard Oil of California | Minnesota Mining & Manufacturing | Sears, Roebuck | Lucent Technologies |
| 14 | Anaconda Copper Mining | Chrysler | Standard Oil of California | Mobil | Johnson & Johnson |
| 15 | Standard Oil of New York | Kodak | Mobil | BellSouth | Cisco Systems |
| 16 | Phelps Dodge | Gulf Oil | GTE | Kodak | AT&T |
| 17 | Singer | International Nickel | Avon | Standard Oil | American International Group |
| 18 | Jones & Laughlin Steel | Socony-Vacuum Oil | Hewlett-Packard | Hewlett-Packard | Berkshire Hathaway |
| 19 | Westinghouse Electric | Kennecott Copper | Procter & Gamble | Coca-Cola | Eli Lilly |
| 20 | American Tobacco | Pennsylvania Railroad | Standard Oil of Indiana | Wal-Mart | SBC Communications |

Note:
Rankings are based on market value.
Sources: Forbes, Jul. 13, 1987 (1917, 1945, 1967, 1987); Standard & Poor's Compustat database (1998)

To understand the power of a properly funded DB plan, a steel company pension plan from the same location and the same time as the Wisconsin Steel failure is examined, but here, the outcome is vastly different.

In 1980, located a just a few miles to the northeast of Wisconsin Steel, was Indiana Harbor Works of Inland Steel (now part of Mittal Steel). Wisconsin Steel and Inland were part of a thirty-five mile industrial arc that combined to be the most concentrated steel-making center in the world. Both Wisconsin Steel and Inland Steel suffered the devastating impact from the Midwest industrial closures of the 1980s and 1990s (Fallows, James, "America's Changing Economic Landscape", *The Atlantic Monthly*, March 1985).

But the outcome for Inland workers was far different from that of the Wisconsin Steel workers. While Inland's employment shrunk and the company was sold, first to Ispat and then Mittal, all Inland pensioners received full pension checks from the Inland Steel pension fund. The reason: Inland fully funded its pension plan. In 1998, when Inland Steel was purchased by Ispat International N.V., the fair value of its pension assets was $2 billion and its projected benefits obligation (PBO) was $2 billion (Ispat SEC filing, 1998).

Equally important, Inland made the decision to immunize its liabilities by buying U.S. Treasuries that matched its expected future pension payments. Hence, Inland made the funding of its pension promise to its workers independent of Inland's future economic prospects or the prospects of the returns from higher risk-return assets. So, while many Inland Steel workers lost their jobs in the economic change that swept their industry, they did not simultaneously lose their vested pension income: the security of their pension income was uncorrelated to the security of their jobs.

Failures—When the Pension Promise is Changed.

In April 2010, near the end of the "Great Recession" of 2008-2010, the Illinois State Legislature voted to reform pensions for state employees. The vote was described by Illinois Governor Pat Quinn as a "political earthquake."

The changes put a cap on the amount of earnings that can be used as the basis for calculating benefits. Some of the change was in response to employees gaming the system by "spiking" their last year's earnings by accumulating large overtime pay to be included in the pension calculation. But most of the change is to deal with unfunded retirement-income promises to state employees. For example, most new Illinois government employees must now work until age 67 to be eligible for full retirement benefits. (Those already on the state payroll can still retire at 55 with full benefits). This "earthquake" in Illinois demonstrates that governments can and do change pension promises.

The economic stresses from the 2008-2009 recession have led to 22 of 50 US states changing their pension plans. The changes include increasing retirement dates, decreasing future pension increases, and increasing employee contributions.

A second retirement-income earthquake occurred in April 2010: the U.S. Social Security Trust Fund experienced a net outflow—a full six years before the forecasted date of 2016.

This brings forward the question for U.S. retirees as they assess their confidence in their retirement-income counterparty: what happens to a pension promise when (1) retirees are promised benefits that exceed their accumulated contributions, (2) retirees live materially longer than expected when the promises were made, and (3) working Americans refuse to pay higher taxes to support this combination of unfunded benefits and longer-than-planned-for lives?

Figure 10:
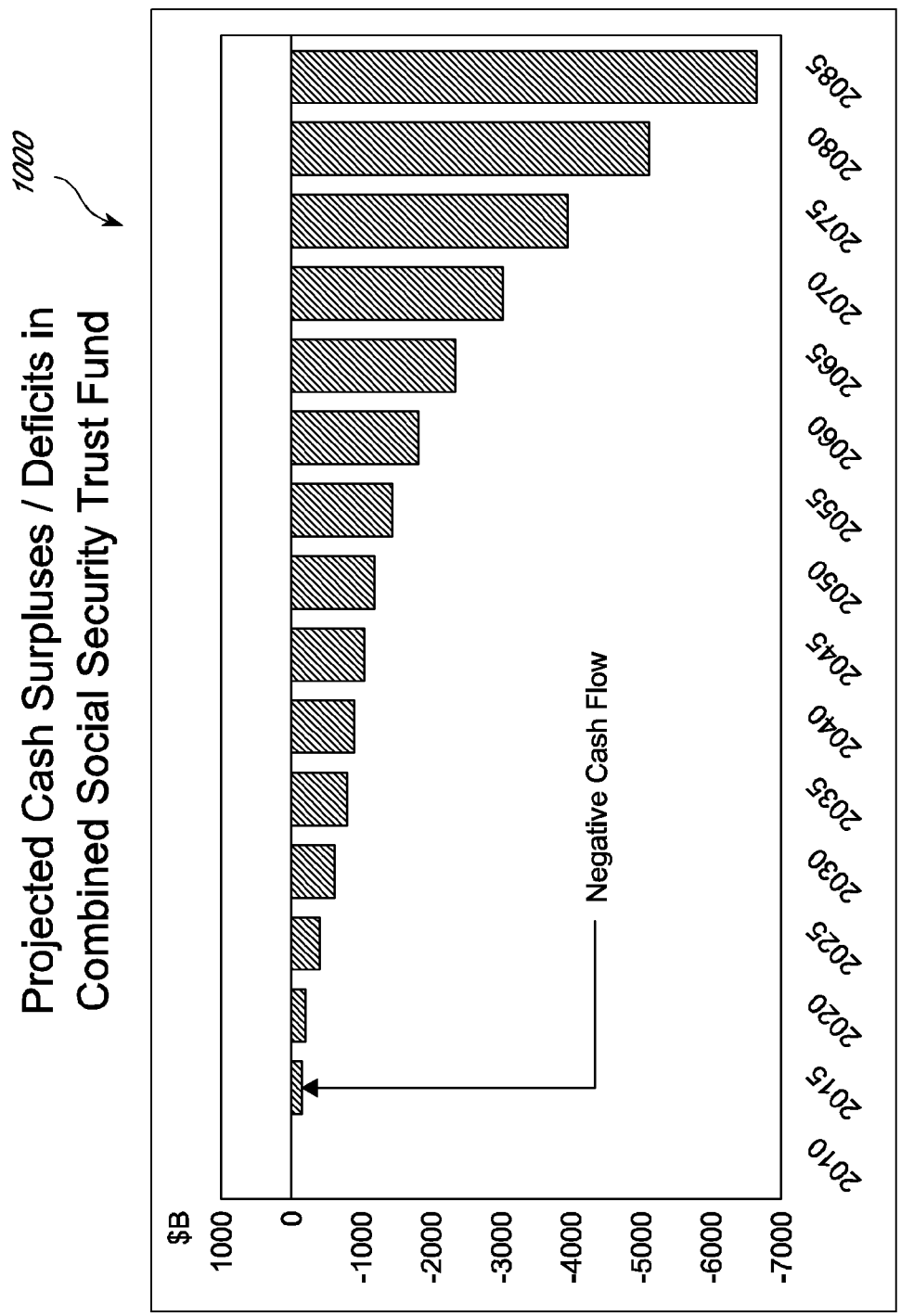
FIG. 10 is an example graph illustrating projected cash surpluses/deficits in the U.S. combined social security trust fund.

A clear option is to change the rules. This is what U.S. Representative Paul Ryan of Wisconsin calls for in his proposal, A Road Map For America's Future. To "secure" Social Security's solvency, Representative Ryan calls for indexing retirement income benefits to personal total income levels, and for all retirees, to increase their retirement date. The alternative to such changes, as the forecast graph 1000 from the Social Security Trustee Reports shows in FIG. 10 (source: 2009 Social Security Trustees Report), could be a catastrophic failure (Ryan, Paul, "A Road Map For America's Future", US House of Representatives, http://www.roadmap.republicans.budgethouse.gov/UploadedFiles/Roadmap2Final2.pdf, January 2010).

It is unclear if Representative Ryan's plan, or a similar plan, will be adopted. What is clear is that the rules will change, or that benefits will be decreased (for a deeper discussion, see the Academy of Actuaries: www.actuary.org.).

What has been viewed as an "unconditional" Social Security pension promise, should be assessed as a conditional promise; a promise subject to change when the conditions change.

Failures—When the Basic Structure is Deficient

Defined contribution plans (DC), deferred salary plans, and similar tax-protected savings plans, were originally conceived and designed as supplemental plans to Social Security and DB plans. They were not designed to be the primary source of retirement income.

DC plans have no longevity pooling and no investment return pooling. In addition, they are subject to the deficiency from undervaluing the implicit promise, the future retirement-income needs, and then not saving enough for long enough.

Figure 11:
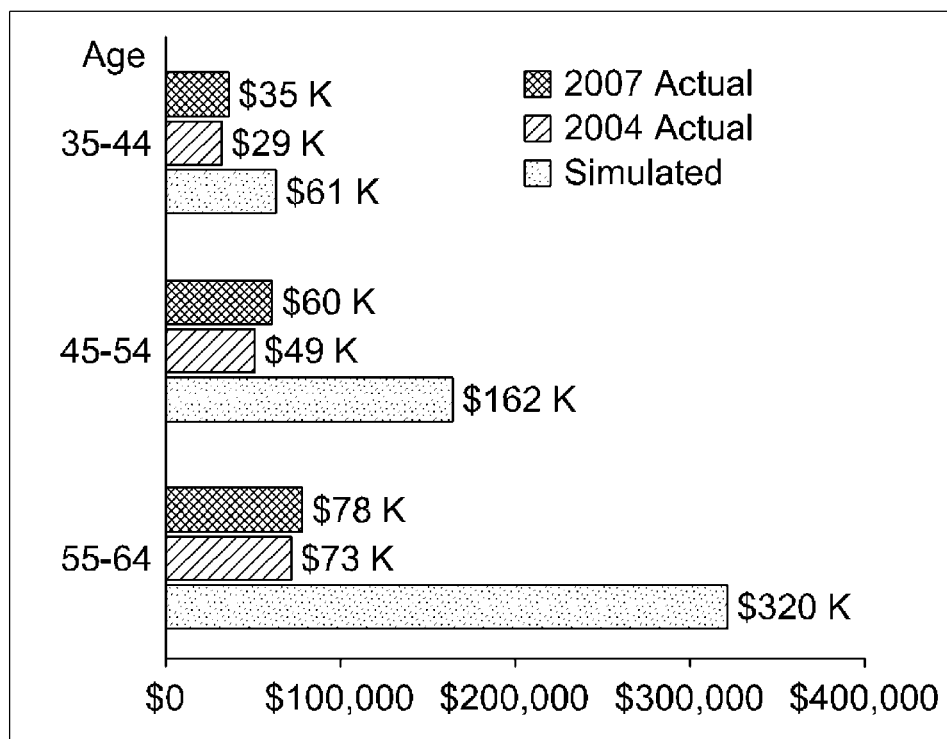
FIG. 11 is an example graph illustrating 401(k)/IRA actual and simulated accumulation of individuals with 401(k) plans, by age group in the years 2004 and 2007.

The Center for Retirement Research at Boston College has computed what would be the expected 401(k)/IRA defined-contribution balance for diligent savers for individuals age 55 to 64 in the year 2007—before the market crash of 2008. The expected balance: $320,000. See example graph 1100 of 401(k)/IRA Actual and Simulated Accumulation of Individuals with 401(k) Plans, by Age Group, 2004 and 2007 of FIG. 11. Please note that sample excludes individuals who only have IRA wealth. 401(k) holdings alone would have been $25,000 for 35-44 year olds, $45,000 for 45-54 year olds, and $60,000 for 55-64 year olds—source is Munnell and Sunden (2004 and 2006) and authors' calculations from the 2007 SCF. The expected balance of $320,000 could have been converted into a lifetime real annuity for a retiree aged 65 of $18,000 per year.

Here is the problem. The average balance in 2007 was only $78,000. And by 2008, it was $56,000. The $56,000 would convert into $3,100 of inflation-protected retirement income for a retiree aged 65 (Munnell, Alicia H., Richard W. Kopcke, Francesca Golub-Sass, and Dan Muldoon, "*An Update on 401(K) Plans: Insights from the 2007 Survey of Consumer Finance*", Center for Retirement Research at Boston College, WP 2009-6, November 2009, FIG. 1.1, page 36).

Here the basic structure failed. People did not save enough for long enough. And, the 60 to 64 year old cohort saw the ending years of their working lives experience one of the worst economic and investment epochs since the 1930s—for them, investment pooling failed.

Failures—The DC Investment Choices are Deficient

A DC plan can offer investment options highly correlated with the employee's job; for example, a biotech fund for a biotech or pharmaceutical company employee. Worse yet, the DC plan can offer an investment option perfectly correlated with the employee's job: company stock.

When a same-industry stock fund or company stock comprises a large part of a DC plan, participants have two risks: the company fails and their retirement savings vanish with their current income, or the whole industry is at risk, much like steel in the U.S. in the 1980s.

Enron is the iconic example of deficient investment choices. Enron collapsed in 2001. As of Dec. 31, 2000, Enron's company-sponsored defined-contribution programs held 62% of the assets in Enron stock (CRS Report for Congress, The Enron Bankruptcy and Employer Stock in Retirement Plans, Patrick Purcell, Mar. 11, 2002). This came about through two major decisions by Enron.

1. Actively encouraging employees to invest in the company
2. Restricting employees from trading out of Enron stock until age 50

Combined with unfortunate timing of changing plan administrators when the employees were "locked-out" of trading their accounts during the meltdown of the company, Enron employees lost billions of dollars in retirement savings.

Enron, while an extreme case of fraud, failure, and loss, was not alone in its DC structure. At the time of the failure of Enron's 401(k) plan, the 401(k) plans of many prominent and respected companies had a substantial component of company stock.

TABLE 11

Congressional Research Service Report, March 2002
Employer Stock in Selected Retirement Plans

| Company Name | Company stock as a percentage of defined contribution plan's assets: | Does company have a defined benefit plan? |
| --- | --- | --- |
| Procter & Gamble | 91.5% | No |
| Anheuser-Busch | 81.6% | Yes |
| Coca-Cola | 81.0% | Yes |
| Abbott Laboratories | 80.0% | Yes |
| General Electric | 77.4% | Yes |
| William Wrigley, Jr. | 75.0% | Yes |
| Pfizer | 74.8% | Yes |
| Home Depot | 72.0% | No |
| BB&T (Branch Banking & Trust) | 69.6% | Yes |
| Texas Instruments | 69.0% | Yes |
| Duke Energy | 67.9% | Yes |
| Target | 66.0% | Yes |
| Textron | 65.0% | Yes |
| Reliant Energy | 64.5% | Yes |
| Kroger | 63.6% | Yes |
| Southern Company | 62.8% | Yes |
| Exxon Mobil | 62.0% | Yes |
| Household International | 61.4% | Yes |
| Sherwin-Williams | 59.1% | Yes |
| BellSouth | 57.9% | Yes |
| Merck | 57.5% | Yes |
| Williams | 57.0% | Yes |
| McDonald's | 56.8% | No |
| TXU (Texas Utilities) | 56.3% | Yes |
| Dell Computer | 53.4% | No |
| Ford Motor Company | 50.2% | Yes |

Source: S.E.C Forms 10-K and 11-K and company spokespersons.
Source: Purcell, Patrick, "CSR Report for Congress", Congressional Research Service. March 2002. Washington DC.

Congress took action and passed new laws specifically targeting the problems exposed by the Enron bankruptcy. Many defined contribution plans, however, still have significant investment in company stock. While this concentrated investment may achieve corporate and personal investment objectives, it runs counter to prudent retirement planning to provide a secure retirement income source.

For the vast majority of employees, human capital (the ability to work today and in the future) is their largest asset and this asset is tightly tied to the company employing them. An optimal asset mix during the accumulation of retirement savings would explicitly account for the correlation between an employee's income stream from work (human capital) and the risk-return profile of their retirement assets (financial capital). A complete plan/solution would also include insurance assets. To invest retirement assets in the employer or the employer's industry, the worker "doubles down" on the bet that the company will do well. This goes against both the basic rules of diversification and the economic history captured in Table 10. Workers could and should diversify away this risk.

What is claimed is:

1. A method of generating an integrated family of benchmarks representing portfolio allocations for a participant, the method comprising:
    identifying an inflation protected asset as a first asset for a portfolio;
    identifying a deferred annuity as a second asset for the portfolio;
    determining, via a computing device, a current market rate for at least the second asset;
    for a D year deferral, determining, via the computing device, a distribution rate for the first asset at year D at a current break-even inflation rate;
    generating, via the computing device, a portfolio allocation to the first and second assets based on the current market rate and the distribution rate for the first asset at year D so as to define a process for obtaining inflation-protected income for a predetermined number of years and then non-inflation protected income for subsequent years; and
    publishing, via a network connected to the computing device, the identified assets and the portfolio allocations.

2. The method of claim 1, further comprising additionally publishing, for a given participant, one or more of a break-even inflation rate, income at year zero, the cost of a deferred annuity that provides $1 for life beginning in a predetermined number (D) of years, and income at the predetermined number (D) of years.

3. The method of claim 1, wherein a source of the funding of the assets includes retirement income payouts.

4. The method of claim 1, wherein a source of the funding of the assets includes one or more of defined contribution plan payouts, defined benefit plan payouts, 401(k) plan payouts, or any other retirement savings of any nature.

5. The method of claim 1, wherein at least one of the assets has a low counter-party risk.

6. The method of claim 1, wherein at least one of the assets is an inflation protecting asset.

7. The method of claim 1, wherein at least one of the assets is a longevity pooling asset.

8. The method of claim 1, wherein at least one of the assets is treasury inflation protected securities.

9. The method of claim 8, wherein the treasury inflation protected securities define an asset for obtaining income for the predetermined number of years and at the end of the predetermined number of years, the treasury inflation protected securities has a balance of zero.

10. The method of claim 1, wherein at least one of the assets is a deferred annuity or any similar existing or future asset that exhibits deferral and pooling characteristics.

11. The method of claim 10, wherein the deferred annuity begins at the maximum maturity of a treasury inflation protected securities market.

12. The method of claim 11, wherein the maximum maturity of a treasury inflation protected securities market is 20 years.

13. The method of claim 10, wherein the deferred annuity begins at a selected maturity of treasury inflation protected securities.

14. The method of claim 1, wherein a benchmark representing portfolio allocations for a participant is generated daily.

15. The method of claim 1, additionally comprising publishing, via the network, a payout vector for a predetermined investment amount, the payout vector including an initial payout for year one, the break-even inflation rate, and the number of years of the deferral.

16. The method of claim 1, wherein the portfolio allocation percentage for the first and second asset are separately calculated for male participants and for female participants at each participant age in a range of ages from age 60 to age 70.

17. The method of claim 16, additionally comprising publishing, via the network, a payout vector for a predetermined investment amount for each combination of age and sex, the payout vector including an initial payout for year one, the break-even inflation rate, and the number of years of the deferral.

18. The method of claim 1, additionally comprising selecting, via the computing device, a particular inflation protected securities portfolio or fund based on payouts and a particular annuity based on a current market price.

19. A non-transitory computer readable medium having instructions that when executed by a processor perform a method comprising:
    obtaining at least one of stated payout ratios periodically for at least one inflation protected securities portfolio or fund offered by an asset management company, or payouts of a predetermined number of years laddered inflation protected securities portfolio;
    identifying at least one annuity;
    for a D year deferral, selecting a particular inflation protected securities portfolio or fund based on the payout ratios and the particular annuity based on a current market price;
    determining a portfolio allocation for the selected inflation protected securities portfolio or fund and the selected annuity based on at least a current break-even inflation rate of the inflation protected securities portfolio or fund so as to define a process for obtaining inflation-protected income for the predetermined number of years and then non-inflation protected income for subsequent years; and
    publishing, via a network, the portfolio assets and corresponding allocations.

20. The computer readable medium of claim 19, wherein the portfolio allocation percentage for the selected annuity and the portfolio allocation percentage for the inflation protected securities portfolio or fund are calculated for participant ages of at least two of age 60, age 65 and age 70.

21. The computer readable medium of claim 19, wherein the method additionally comprises publishing, via a network, one or more of: a) the income in the predetermined number of years given a break-even inflation rate and the portfolio allocation, b) income at year zero resulting from the portfolio allocation, c) a break-even inflation rate of the relevant inflation protected securities portfolio or fund, and d) a cost of the selected annuity that provides $1 for life beginning in the predetermined number of years.

22. A system for generating an integrated family of benchmarks representing portfolio allocations for a participant, the system comprising:
- means for identifying an inflation protected asset as a first asset for a portfolio;
- means for identifying a deferred annuity as a second asset for the portfolio;
- means for determining a current market rate for at least one of the assets second asset;
- for a D year deferral, means for determining a distribution rate for the first asset at year D at a current break-even inflation rate;
- means for generating a portfolio allocation to the first and second assets based on the current market rate and the distribution rate for the first asset at year D so as to define a process for obtaining inflation-protected income for a predetermined number of years and then non-inflation protected income for subsequent years; and
- means for publishing the identified assets and the portfolio allocations.

* * * * *

UNITED STATES PATENT AND TRADEMARK OFFICE
CERTIFICATE OF CORRECTION

| | | |
|---|---|---|
| PATENT NO. | : 8,650,109 B2 | Page 1 of 1 |
| APPLICATION NO. | : 13/282356 | |
| DATED | : February 11, 2014 | |
| INVENTOR(S) | : Stephen Charles Sexauer et al. | |

It is certified that error appears in the above-identified patent and that said Letters Patent is hereby corrected as shown below:

In the Specification,

In column 4 at line 67, change "web site." to --website.--.

In column 6 at line 15, change "web site" to --website--.

In the Claims,

In column 46 at line 39, in Claim 19, change "one" to --an--.

In column 47 at lines 8-9, in Claim 22, change "one of the assets" to --the--.

Signed and Sealed this
Tenth Day of February, 2015

Michelle K. Lee
*Deputy Director of the United States Patent and Trademark Office*